United States Patent [19]
Pandit

[11] Patent Number: 5,937,402
[45] Date of Patent: Aug. 10, 1999

[54] SYSTEM FOR ENABLING ACCESS TO A RELATIONAL DATABASE FROM AN OBJECT ORIENTED PROGRAM

[75] Inventor: Jayant G. Pandit, Lowell, Mass.

[73] Assignee: Ontos, Inc., Lowell, Mass.

[21] Appl. No.: 08/879,241

[22] Filed: Jun. 19, 1997

[51] Int. Cl.⁶ .................................................. G06F 17/30
[52] U.S. Cl. ..................... 707/4; 707/3; 707/2; 707/100; 707/103
[58] Field of Search .............................. 707/2, 3, 4, 100, 707/103

[56] References Cited

U.S. PATENT DOCUMENTS

| 4,525,780 | 6/1985 | Bratt et al. | 364/200 |
| 4,853,843 | 8/1989 | Ecklund | 364/200 |

(List continued on next page.)

OTHER PUBLICATIONS

P. Butterworth et al. "The Gemstone Object Database Management System" *Comm. ACM*, V. 34. N. 10, pp. 65–77, Oct. 1991.
J. Joseph et al. "Object–Oriented Databases: Design and Implementation" *Proc. IEEE*, V. 79, N. 1, pp. 42–64, Jan. 1991.
D. Fishman et al. "IRIS: An Object–Oriented Database Management System" *ACM Trans Ofc Info Sys*, V. 5, N. 1, pp. 48–69, Jan. 1987.
W. Kim "Object–Oriented Databases: Definition and Research Directions" *IEEE Trans Know. and Data Engr.* V. 2, N. 3, pp. 324–341, Sep. 1990.
"Object–Oriented Computing", by David C. Rine et al.. *Computer*, Oct. 1992, pp. 6–10.
"Intergrating Objects with Relational Technology", by Mary E.S. Loomis, *Object Magazine* Jul./Aug. 1991.
"Objects and SQL: Accessing Relational Databases", by Mary E.S. Loomis, *Object Magazine* Sep./Oct. 1991, pp. 68–78.
"Object Indentify", by Setrag N. Khoshaflan et al., *Microelectronics and Computer Technology Corp.*, pp. 37–46, date unkown.
"The Object–Oriented Database System Manifesto", by Malcolm Atkinson, pp. 40–57, date unkown.
"A Description of Object Databases", by Tim Andrews, *Distributed Information*, Jan. 1993.
"Client–Server Architecture", by Mary E.S. Loomis, *Journal of Object–Oriented Programming*, Feb. 1992.
"Object Database–Integrator for PCTE" by Mary E.S. Loomis, *Journal of Object–Oriented Programming*, May 1992.
"ODBC", by Karen Watterson, *Microsoft SQL Server Connection*, undated, pp. 13–18.
"Answer: ZIM—A Professional, Integrated Application Development Enviroment", Sterling Software, Inc. 1994.
"Versant ODBMS", *Versant Object Technology*, 1992.
"Versant Executive Overview", *Versant Object Technology*, 1992.

*Primary Examiner*—Paul V. Kulik
*Assistant Examiner*—Jean R. Homere
*Attorney, Agent, or Firm*—Weingarten, Schurgin, Gagnebin & Hayes LLP

[57] ABSTRACT

Logical tables and logical keys are employed to facilitate interaction between user applications and a relational database. Each logical table is a group of at least one column from a table or view associated with a relational database, and can be utilized like a relational table or view. Each logical primary or foreign key is a key between logical and physical tables that behaves like an actual primary or foreign key. A normalization process allows creation of integrator relational schema objects from existing captured tables. Once a denormalized table is captured from a database the normalization process allows the user to define different logical tables using subsets of the columns of the table. One or more columns of the logical table are designated as primary key. The logical tables interact with the mapping process in the same manner as physical tables.

20 Claims, 21 Drawing Sheets

U.S. PATENT DOCUMENTS

| | | | |
|---|---|---|---|
| 4,864,497 | 9/1989 | Lowry et al. | 364/300 |
| 4,953,080 | 8/1990 | Dysart et al. | 364/200 |
| 4,989,132 | 1/1991 | Mellender et al. | 364/200 |
| 5,008,853 | 4/1991 | Bly et al. | 364/900 |
| 5,010,478 | 4/1991 | Deran | 707/100 |
| 5,079,695 | 1/1992 | Dysart et al. | 395/700 |
| 5,093,914 | 3/1992 | Coplien et al. | 395/700 |
| 5,113,522 | 5/1992 | Dinwiddie, Jr. et al. | 395/700 |
| 5,125,091 | 6/1992 | Staas, Jr. et al. | 395/650 |
| 5,129,083 | 7/1992 | Cutler et al. | 395/600 |
| 5,129,084 | 7/1992 | Kelly, Jr. et al. | 395/600 |
| 5,136,712 | 8/1992 | Perazzoli, Jr. et al. | 395/700 |
| 5,142,674 | 8/1992 | Barker et al. | 395/600 |
| 5,157,777 | 10/1992 | Lai et al. | 395/425 |
| 5,161,223 | 11/1992 | Abraham | 395/600 |
| 5,161,225 | 11/1992 | Abraham et al. | 395/600 |
| 5,170,466 | 12/1992 | Rogan et al. | 395/145 |
| 5,175,848 | 12/1992 | Dysart et al. | 395/600 |
| 5,185,885 | 2/1993 | Dysart et al. | 395/600 |
| 5,187,786 | 2/1993 | Densmore et al. | 395/600 |
| 5,187,787 | 2/1993 | Skeen et al. | 395/600 |
| 5,187,790 | 2/1993 | East et al. | 395/725 |
| 5,191,522 | 3/1993 | Bosco et al. | 705/4 |
| 5,193,180 | 3/1993 | Hastings | 395/575 |
| 5,206,951 | 4/1993 | Khoyi et al. | 395/650 |
| 5,227,967 | 7/1993 | Bailey | 705/35 |
| 5,265,206 | 11/1993 | Shackelford et al. | 395/200 |
| 5,283,894 | 2/1994 | Deran | 707/1 |
| 5,291,583 | 3/1994 | Bapat | 395/500 |
| 5,291,593 | 3/1994 | Abraham et al. | 395/600 |
| 5,295,256 | 3/1994 | Bapat | 395/500 |
| 5,327,559 | 7/1994 | Priven et al. | 395/700 |
| 5,369,761 | 11/1994 | Conley et al. | 707/2 |
| 5,386,564 | 1/1995 | Shearer et al. | 395/650 |
| 5,388,264 | 2/1995 | Tobias, II et al. | 395/650 |
| 5,499,371 | 3/1996 | Henniger et al. | 395/702 |
| 5,542,078 | 7/1996 | Martel et al. | 707/101 |
| 5,701,453 | 12/1997 | Maloney et al. | 707/2 |
| 5,734,887 | 3/1998 | Kingberg et al. | 707/4 |
| 5,778,375 | 7/1998 | Hecht | 707/101 |

FIG. 23

Team_Player_Pitcher

| TEAM_NAME | CITY | SEASON_LOSSES | SEASON_WINS | HOME_FIELD | IN_DIVISION | PLAYER_NAME | AGE | PITCHER_NUMBER | CURRENT_SEASON_LOSSES | CURRENT_SEASON_WINS |
|---|---|---|---|---|---|---|---|---|---|---|
| Tigers | Darlington | 7 | 25 | Darlington Stadium | American_East | John Andres | 22 | 22 | 7 | 25 |
| Tigers | Darlington | 7 | 25 | Darlington Stadium | American_East | Keith McSally | 31 | 48 | 5 | 27 |
| Red Sox | Boston | 1 | 31 | Boston Garden | New Engand | John Adams | 24 | 39 | 1 | 31 |
| Red Sox | Boston | 1 | 31 | Boston Garden | New Engand | Mike Wallace | 30 | | | |
| New Sox | Boston | 4 | 28 | Boston Garden | American_East | Terry Stone | 21 | 54 | 10 | 22 |
| | | | | | | | | | | |
| | | | | | | | | | | |

SYSTEM FOR ENABLING ACCESS TO A RELATIONAL DATABASE FROM AN OBJECT ORIENTED PROGRAM

CORSS REFERENCE TO RELATED APPLICATIONS

Not Applicable

STATEMENT REGARDING FEDERALLY SPONSORED RESEARCH OR DEVELOPMENT

This invention was made with government support. The U.S. government has certain rights in this invention.

BACKGROUND OF THE INVENTION

A need exists for interfacing object oriented software applications with relational databases. One method of interfacing an object oriented application with a relational database is to adapt the queries made by the application to the relational database. More particularly, object operations are translated into relational database calls. However, this technique is processor-intensive and sacrifices some of the advantages associated with the object oriented model. As a result, the object oriented software application is unable to function efficiently.

Another method of interfacing an object oriented application with a relational database is to translate database information into a format which is compatible with the object oriented application. Relational databases typically separate data into a plurality of tables through a process known as "normalization" to minimize duplication. A normalized relational database includes a plurality of tables, wherein each table includes at least one field and one key, and each field in each table is uniquely dependent upon the table's key. These tables can be directly translated into objects. However, normalized tables are structured quite differently from objects. More particularly, the collection of information in the fields of the tables often fails to match the collection of information that would typically be found in a well designed object. Consequently, such objects can cause problems for the software application.

BRIEF SUMMARY OF THE INVENTION

In accordance with the present invention logical tables and logical keys are employed to facilitate interaction between user applications and a relational database. Each logical table is a group of at least one column from a physical table or view associated with a relational database, and can be utilized like a physical table. Each logical key is a key between logical and physical tables that behaves like an actual foreign key. A normalization process allows creation of Ontos integrator relational schema objects from existing captured tables. Once a denormalized table is captured from a database the normalization process allows the user to define different logical tables using subsets of the columns of the table. One or more columns of the logical table are designated as primary key. The logical tables interact with the mapping process in the same manner as physical tables.

BRIEF DESCRIPTION OF THE DRAWING

Other features and advantages of the present invention will become apparent in light of the following detailed description of the drawing in which:

FIG. 23 illustrates denormalized schema.

DETAILED DESCRIPTION OF THE INVENTION

U.S. Pat. No. 5,542,078 issued Jul. 30, 1996 is incorporated herein by reference.

Figure 1:
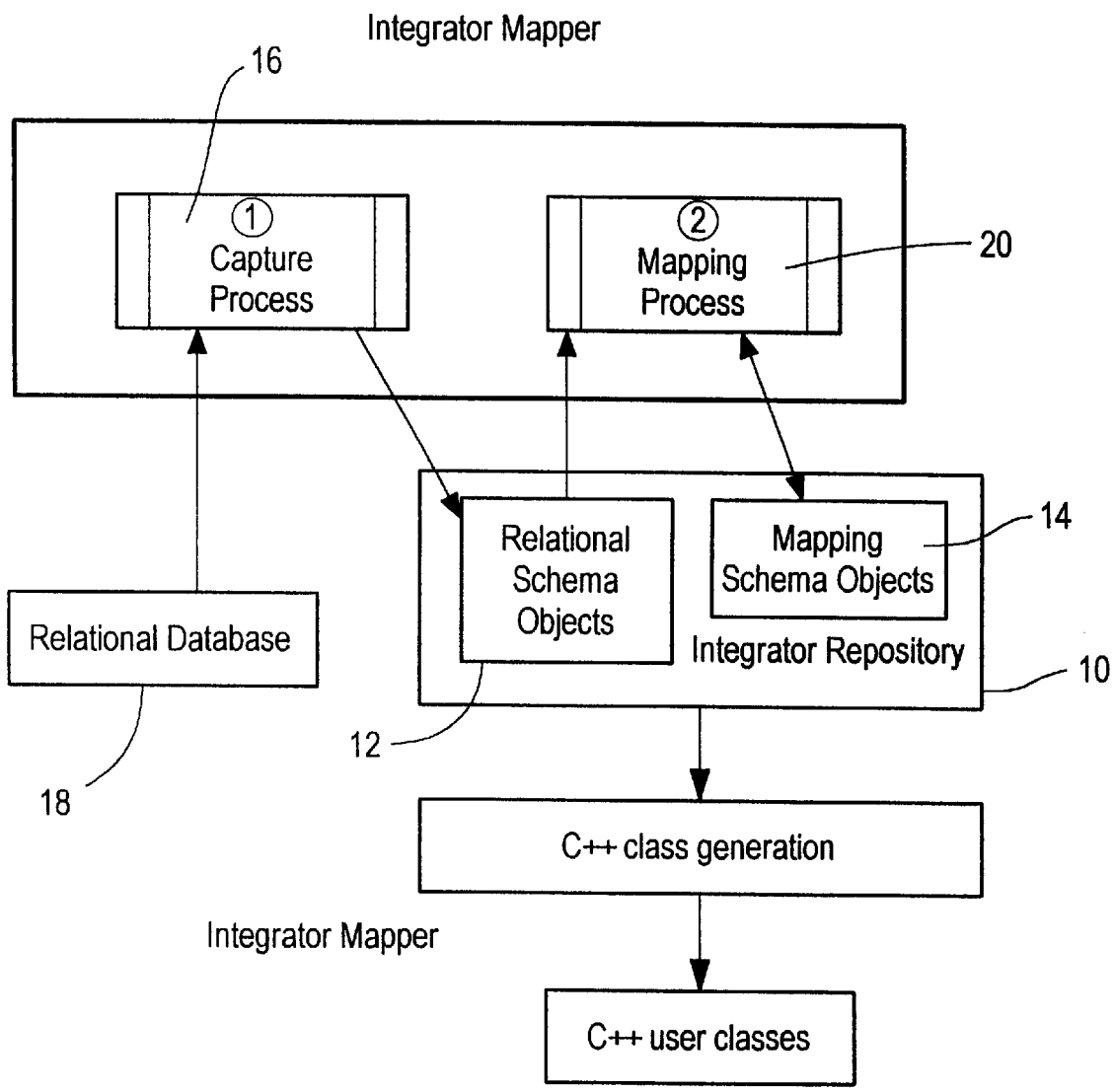
FIG. 1 is an integrator mapping process block diagram.

FIG. 1 illustrates a mapping process and its result. Mapping tools include an Ontos integrator ("integrator") repository 10 containing two major parts: relational schema objects 12 and mapping schema objects 14. The relational schema objects form one component, and the other component is a set of objects that maintains information on mappings between C++ types and relational schema objects. These objects are termed 'Mapping Schema Objects.'

Distinct processes are provided by the mapping tools. A Capture Process 16 reads the relational schema from the relational database 18 and creates the Relational Schema Objects 12 in the integrator repository 10. The capture process allows a user to capture a schema, in its entirety or in part, from the supported relational database to create the Relational Schema Objects in the repository. These objects are used by the mapping process 20 to create mapping and runtime support structures in the repository 10. Both capture and mapping processes are available through a graphical tool Schema Mapper as well as through two independent command line interface tools. The capture and mapping processes are numbered to signify that the steps must be taken in that sequence.

Figure 2:
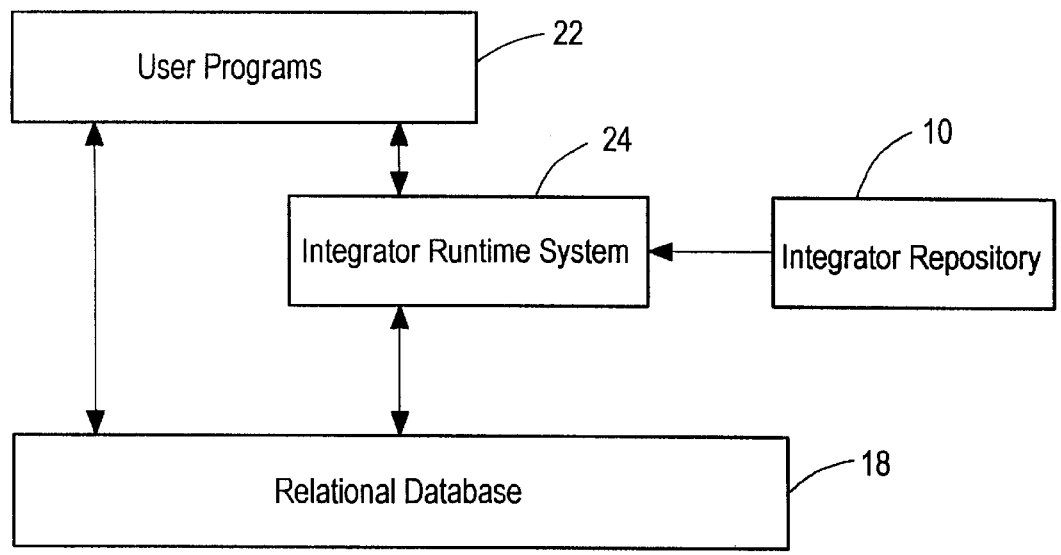
FIG. 2 is an integrator runtime block diagram.

FIG. 2 illustrates how the integrator repository 10 created by the mapping process is used by end users. A user program 22 accesses the relational database 18 through a runtime system 24. The runtime system uses the repository created by the processes described with reference to FIG. 1. The runtime system only reads the repository; it is not allowed to write any persistent information whatsoever to the repository.

Figure 3:
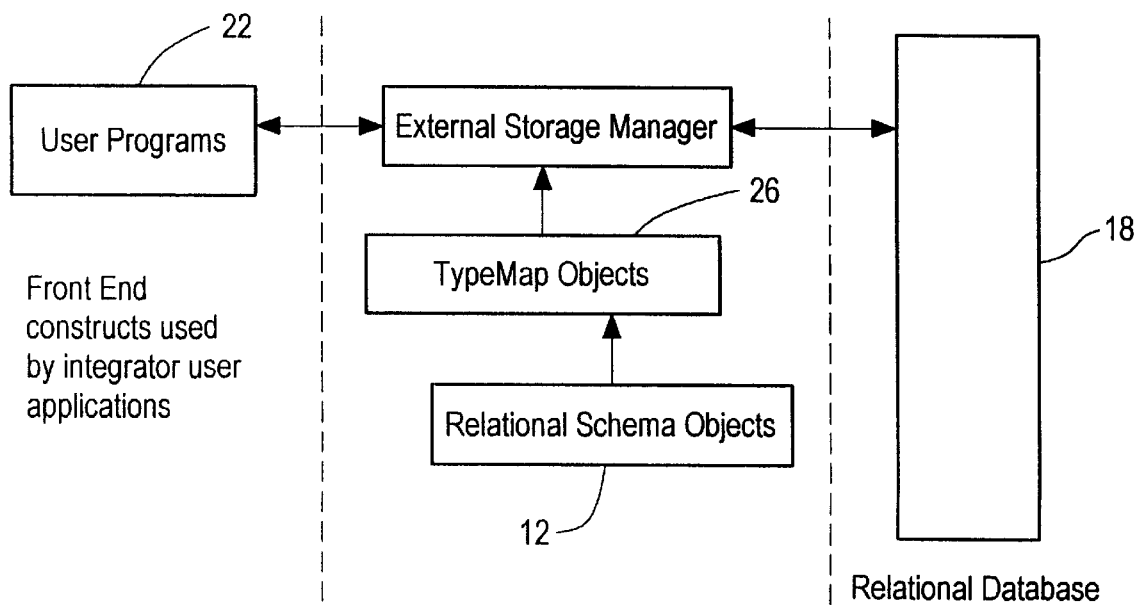
FIG. 3 illustrates the integrator runtime system.

FIG. 3 illustrates the integrator runtime system 24 (FIG. 2). The runtime system reads TypeMap objects 26, which are part of the Mapping Schema, and converts the requests from user programs into appropriate relational messages. The TypeMap objects in turn depend on the Relation Schema Objects to provide the necessary support to the Storage Manager object.

Through this process, the runtime system provides an object oriented view of the relational data in the relational database 18. The design of the runtime system is such that it does not prevent the user program 22 from independently accessing the relational database at the same time. The availability of such use, however, may be limited by the features of the relational database in use.

The capture process first creates schema for which the user is required to supply a name, valid relational database user and password. The basic unit for the capture process is a relation, table, view or stored procedure. The capture process creates persistent objects in the schema for each table or view selected by the user. This process of creating a repository persistent object for a selected relational database object is termed 'Capture of the object from the relational database into schema.' All of the columns associated with the tables are captured only if both the tables involved in the foreign key relationship are captured into the schema. The capture process thus creates a particular representation of the chosen parts of the relational schema in a particular schema.

The integrator schema object described here defines the scope of the mapping process. The mapping processes can process relational tables, views, columns and keys only one schema at a time.

Figure 4:
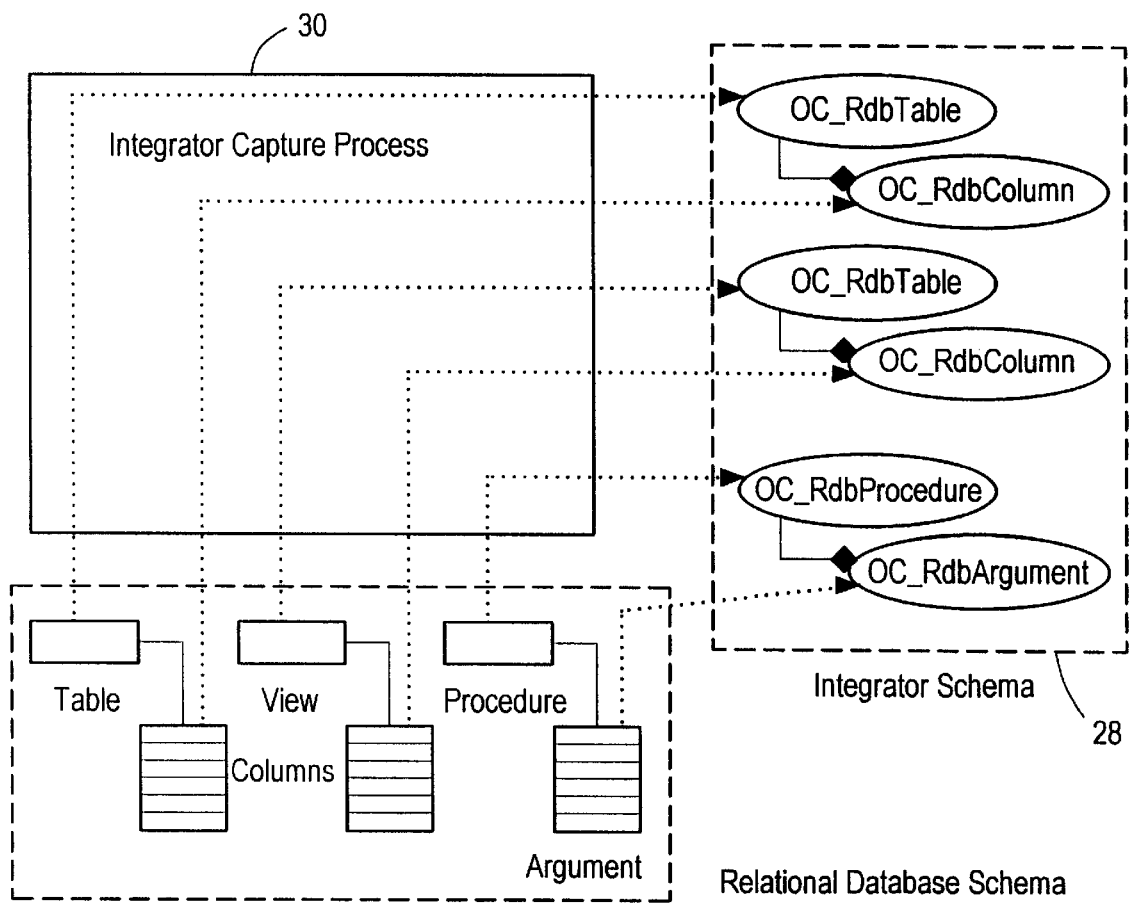
FIG. 4 illustrates creation of schema.

FIG. 4 shows some of the detail of integrator relational Schema objects 28 created from the captured relational database. The diagram shows only major integrator objects. One integrator object is created for each captured relational object, i.e., one OC_RdbTable object for each table and one OC_RdbColumn for each column captured. The capture process 30 is not limited to tables or views having the relational primary key constraint associated with them. Further, stored procedures support is provided.

In addition to creating a new schema, the capture process also allows recapture of already captured objects into an existing schema. In this process, all the changes made to the relational object in the relational database subsequent to the capture are also made to object representations already captured into the integrator schema. This process is termed as schema update.

The capture process also allows removal of captured objects from an integrator schema. In this process, the relational object representations created in the integrator schema are simply removed from a schema. All the other remaining objects in the schema are adjusted to account for the loss of the removed object. This process is called schema delete. Schema update and delete processes have significant effects on the mapping process.

Other Relational Schema Objects not specifically shown in the diagram are the primary and foreign key constraints. These integrator schema objects related to OC_RdbTable objects are created in integrator schema for each primary and foreign key associated with the captured table automatically. The user is not allowed to choose the key constraints to be captured. The primary and foreign key constraints are an important part of relational database technology, which essentially identifies data uniqueness and how data in two different tables relate to each other. These constraints essentially define relational data integrity. Hence, this information is captured as is defined in the database.

Figure 6:
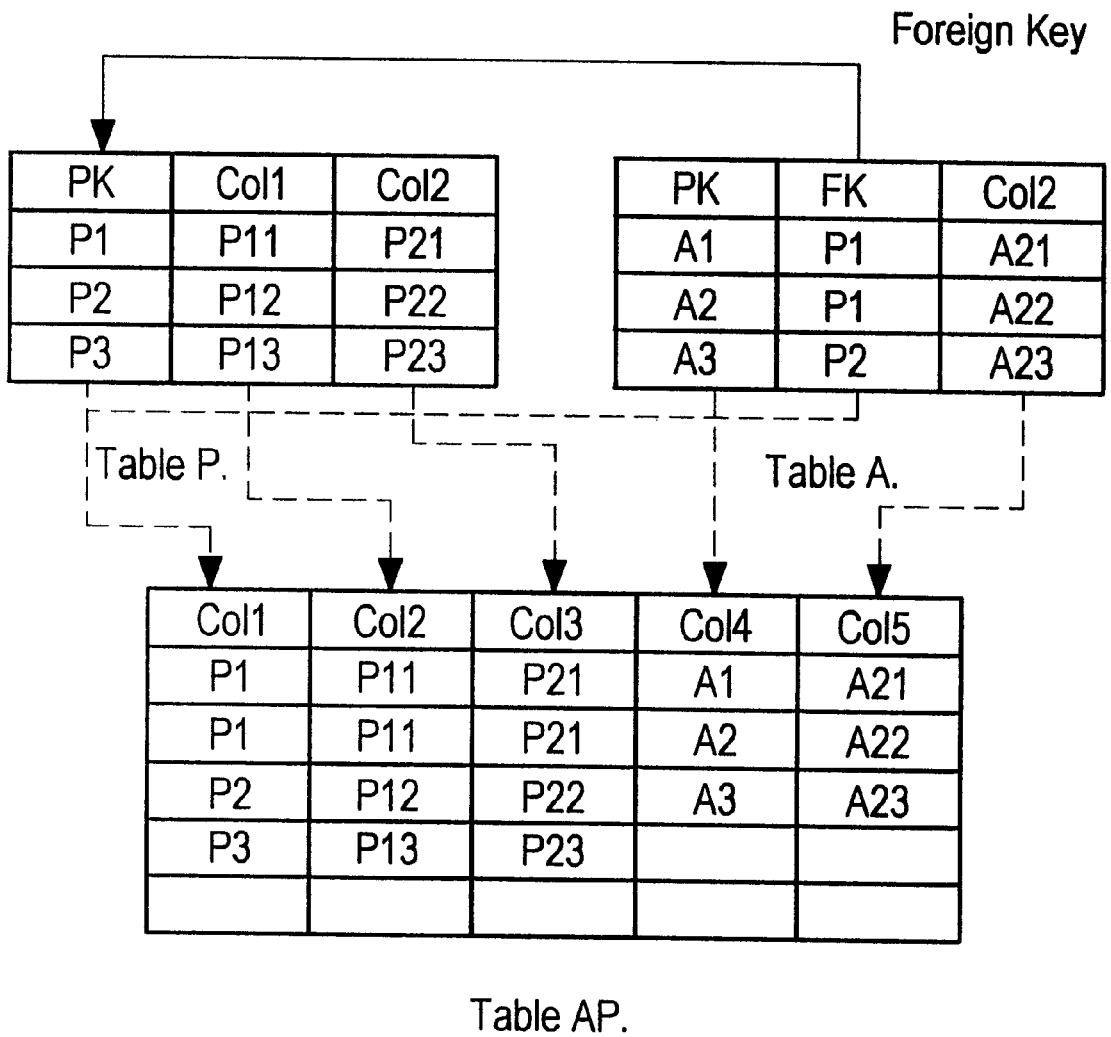
FIG. 6 illustrates an example of denormalization.

Denormalization is a well known concept in the database art which describes a condition in which two related tables are compressed together into a single table. In denormalization in a relational database, two tables P and A have three columns each and primary keys. One of the columns of table A is a foreign key to table P. When these tables are denormalized into a single table AP it has five columns. FIG. 6 shows how the tables and any data in them would look in each case.

FIG. 6 illustrates an example of denormalization. Essential differences in the normal tables A, P and the denormalized table AP are that the table AP may not have a primary key defined on it, since it can contain empty rows. Also, data may be duplicated in table AP for a number of real objects in table P.

Figure 5:
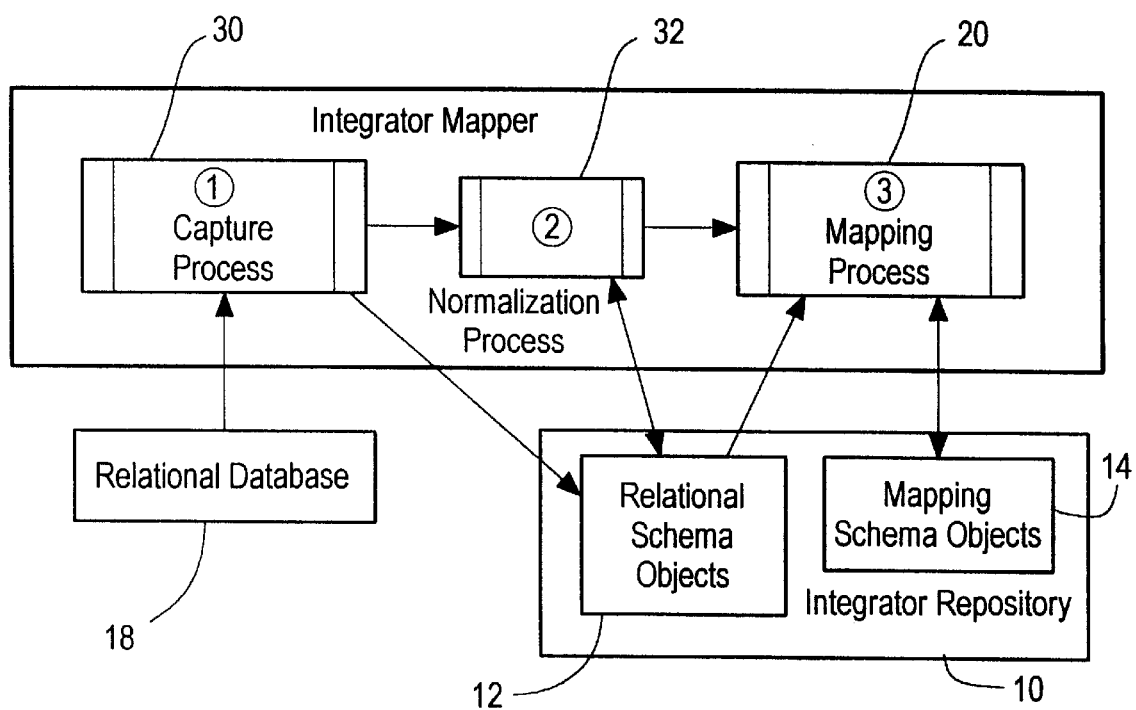
FIG. 5 illustrates the normalization process.

FIG. 5 illustrates a normalization process 32. The integrator normalization process provides new means to create new integrator Relational Schema Objects from existing captured tables, instead of from the database as is done in the capture process. Once a denormalized table such as table AP is captured from a database, the normalization process allows the user to define different tables using subsets of columns of the table AP. This new table is hence a subset of a real physical table in the database and is henceforth referred to as a logical table. The real database table is referred to as a physical table. In the process one or more columns of the logical table are designated as primary key. This primary key is also referred to as a logical primary key. Thus from table AP, logical tables P_L and A_L can be created from the table AP. These logical tables P_L and A_L are treated by the mapping process (FIG. 1) exactly as if they are real physical tables in the database.

The logical table definition is based on a concept of 'Discriminator.' For each logical table definition, the user is required to supply the Discriminator. The discriminator is a valid "where" constraint clause which must be syntactically valid in an SQL Select statement on the physical table. The discriminator defines the basic constraint on the physical table that a row must satisfy in order to be visible through the logical table. Hence, not all the rows of the physical table are part of every logical table defined on that physical table. The rows of the physical table that do not satisfy the discriminator condition of a logical table are not considered part of the logical table.

Figure 7:
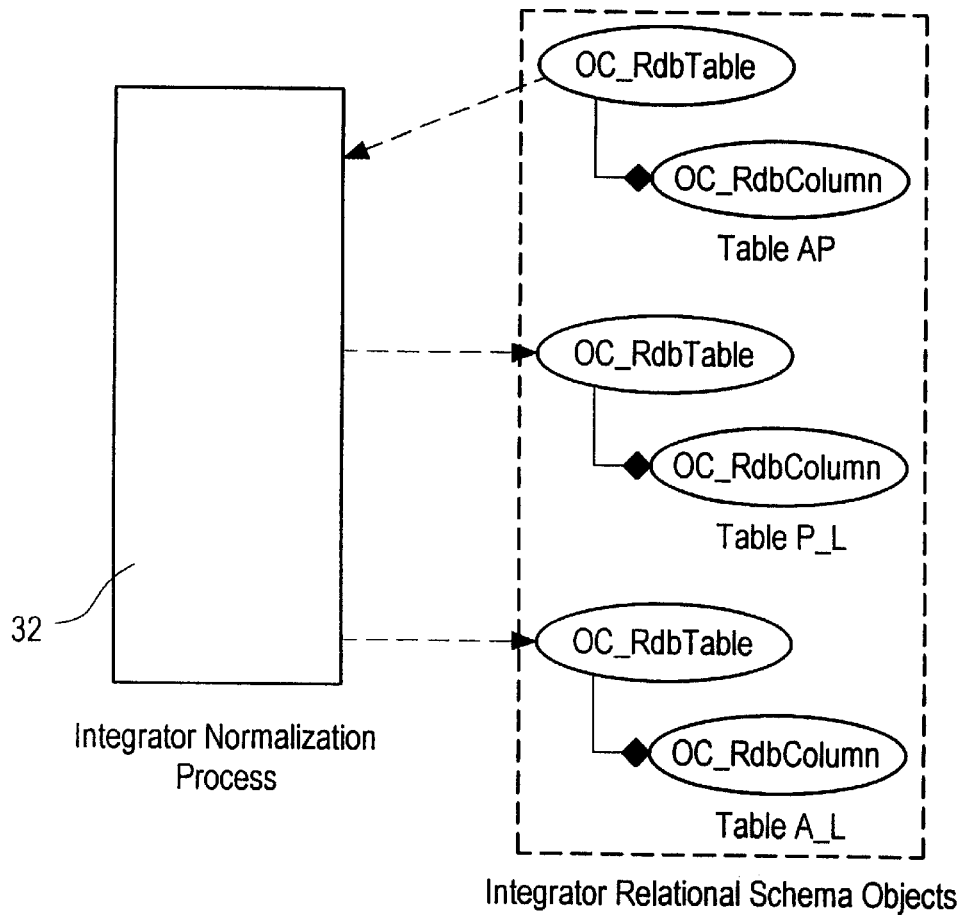
FIG. 7 further illustrates the normalization process.

FIG. 7 illustrates the normalization process 32. There is no restriction on which columns can be used in the logical primary key. The normalization process also provides means to create foreign key relationships from a physical or logical table to another physical or logical table having a physical or logical primary key.

Such table and key definitions exist only in integrator schema and do not exist in the relational database. The integrator runtime system, however, provides support such that to the user it appears as if the tables and keys are really defined in the relational database. The integrator runtime support provides all the functionality required to maintain the data integrity as defined by the logical foreign key relationships. The relational database itself is responsible for providing data integrity support for the physical keys. Subsequent sections describe integrator data integrity assurance for the denormalized schema structure.

Any captured physical table can be used to define logical tables. The physical table may or may not have a primary key or foreign keys of its own. In either case, the integrator ignores all key constraints while creating the logical table. The user must define new constraints for the new logical tables even if they are the same as the constraints on the physical table. There is no restriction on the number of logical tables that can be created on a single physical table. The mapping process either creates new types from a set of tables and foreign keys, or maps a set of tables and foreign keys to an existing type and its properties.

The integrator denormalization support provides maximum reuse of existing mapping technology. The process uses the integrator schema core objects created by the capture. Since the normalization process creates schema core objects in substantially the same manner as the capture process, no change is required in the mapping process to support the denormalized schema. A classify process involves creating C++ type definitions in the integrator schema from C++ header file(s). This is a significant step in integrator processes in which integrator allows mapping of tables to predefined types as well as to new types.

A validate process creates standard query language ("SQL") statements required at runtime for the normal table structure. This is user visible and a clearly separate and required user action. The process prepares a number of SQL statements that are required by the runtime system. These SQL statements contain placeholder flags which are filled by the runtime system for each message required to be sent to the database. This is a performance measure to save time at runtime by doing the work of generating the SQL statements beforehand.

A code generation process generates C++ code for the types in the integrator schema. This step is required in the use of the integrator product.

Runtime process support means that the integrator libraries provide support to create, modify and delete appropriate relational rows mapped integrator objects. The logical tables feature essentially means that integrator allows a single physical table to be split into virtually any number of separate tables and still preserves the data integrity as defined by the foreign key relationships.

The runtime libraries check for the denormalized structures in schema and take different routes for sending appropriate messages to the relational database. The primary route of the prepared statements provides access to the normal schema structure in which the data integrity is provided by the underlying relational database, whereas the denormalized tables are handled by an entirely different set of objects and the data integrity is ensured by integrator itself. This is a significant responsibility assumed and shouldered by integrator. In short, integrator guarantees that the user-defined logical tables and keys will behave exactly as if they were real tables and keys defined in the relational database.

The processing required in integrator to ensure the data integrity is significant. The create, modify, collection add and remove, and delete messages each require sufficiently different processing that may warrant a separate diagrammatic explanation. Interaction of create, modify and delete with the mapped denormalized collections is also a significant process.

Figure 8:
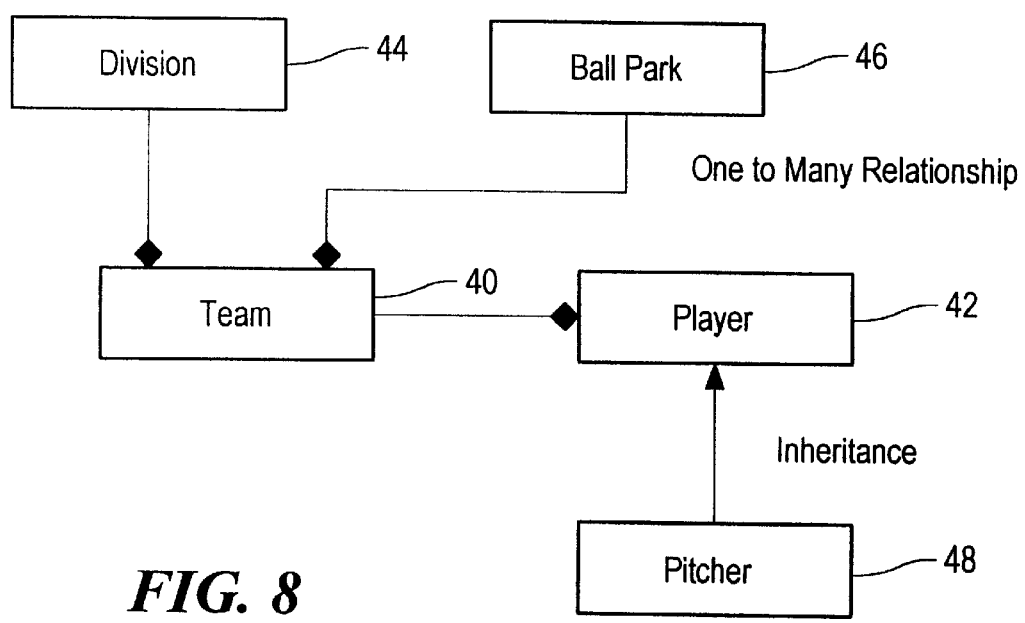
FIG. 8 is an object model diagram.
Figure 9:
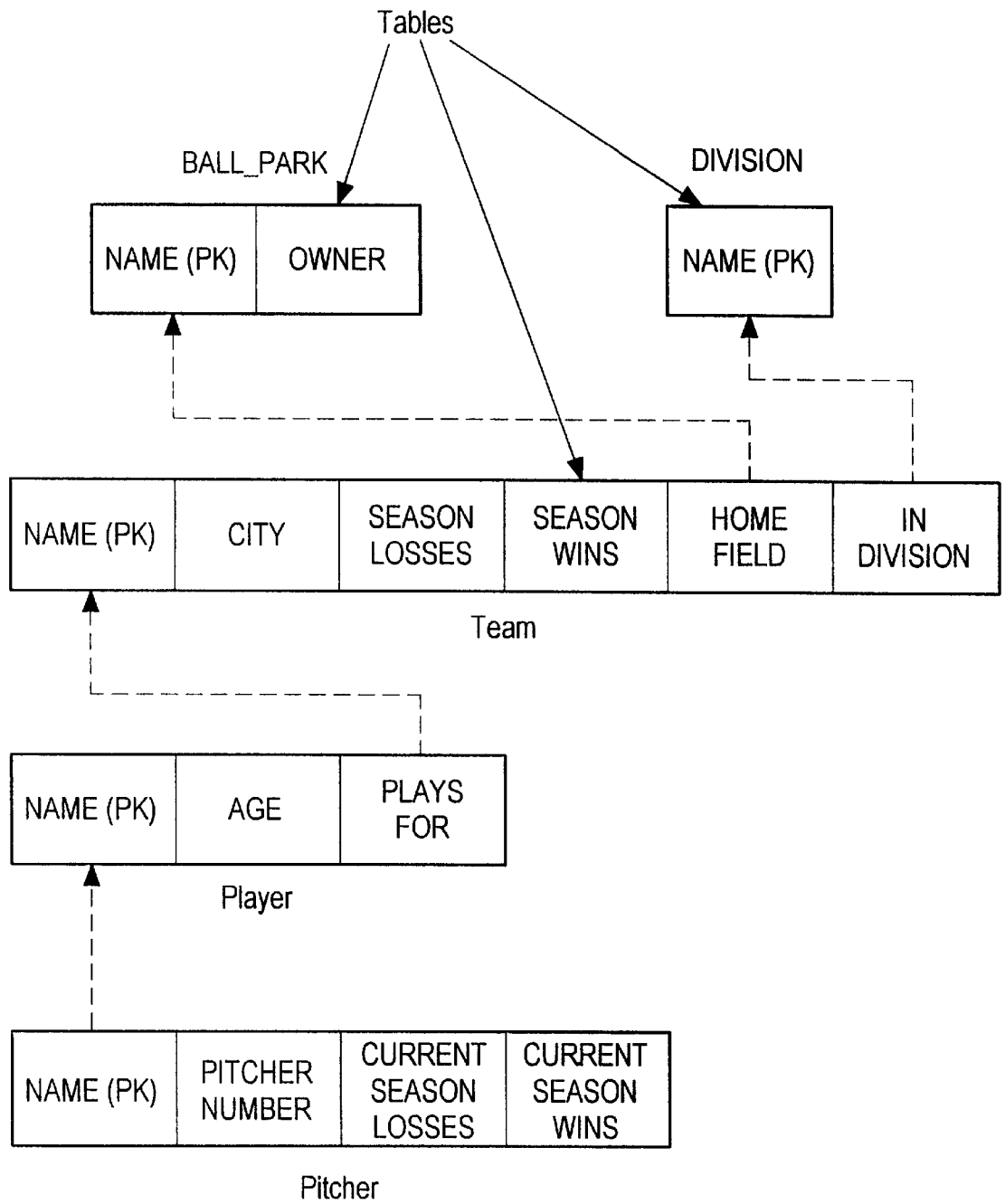
FIG. 9 illustrates normalized schema form.

Referring to FIGS. 8 and 9, the invention will now be described by way of example illustrated in a simple object model for which the relational database structures for normalized and two denormalized forms are shown. FIG. 8 is an object model based upon a baseball analogy in which Team 40 is an aggregation of Player 42, Division 44 is an aggregation of Team and Ball Park 46 has many Team 40. Further, Pitcher 48 is associated with Player through inheritance.

FIG. 9 illustrates normalized schema form. The relational schema are illustrated in a normal form that can be designed to provide the object model. The primary key column for a table is indicated by "(PK)."

Tables 1–5 describe a small data set that more clearly demonstrates the table structure. The same data is referenced to demonstrate schemas in subsequent sections.

TABLE 1

Division

NAMES

American East
New England
American Midwest

TABLE 2

Ball Park

| NAME | OWNER |
| --- | --- |
| Boston Garden | City of Boston |
| Darlington Stadium | City of Darlington |
| NY Stadium | City of New York |

TABLE 3

Team

| NAME | CITY | SEASON_LOSSES | SEASON_WINS | HOME_FIELD | IN_DIVISION |
| --- | --- | --- | --- | --- | --- |
| Tigers | Darlington | 7 | 25 | Darlington | American East |
| Red Sox | Boston | 1 | 31 | Boston Garden | New England |
| New Sox | Boston | 4 | 28 | Boston Garden | American East |

TABLE 4

Player

| NAME | PLAYS FOR | AGE |
| --- | --- | --- |
| John Andrews | Tigers | 22 |
| Keith McSally | Tigers | 31 |
| John Adams | Red Sox | 24 |

TABLE 4-continued

Player

| NAME | PLAYS FOR | AGE |
|---|---|---|
| Mike Wallace | Red Sox | 30 |
| Terry Stone | New Sox | 21 |

TABLE 5

Pitcher

| NAMES | PITCHER NUMBER | CURRENT SEASON LOSSES | CURRENT SEASON WINS |
|---|---|---|---|
| John Andrews | 22 | 7 | 25 |
| Keith McSally | 48 | 5 | 27 |
| John Adams | 39 | 1 | 31 |
| Terry Stone | 54 | 10 | 22 |

Tables 6 and 7 are denormalized schema tables. A single normal structure can be denormalized in a number of different ways. We consider two possibilities in these examples. The denormalization achieved by Tables 6 & 7 is termed as FORM I denormalization. The table structure provides the same object model as the Normalized Schema structure described earlier. In a denormalized schema structure a single table may contain more than one user object. In such case it is essential to understand which column belongs to which object.

TABLE 6

Team_Division_Ball_Park

| TEAM_NAME | CITY | SEASON_LOSSES | SEASON_WINS | BALL_PARK_NAME | OWNER | DIVISION_NAME |
|---|---|---|---|---|---|---|
| Tigers | Darlington | 7 | 25 | Darlington Stadium | City of Darlington | American East |
| Red Sox | Boston | 1 | 31 | Boston Garden | City of Boston | New England |
| New Sox | Boston | 4 | 28 | Boston Garden NY Stadium | City of Boston City of New York | American East American Midwest |

Table 6 contains three distinct objects, namely 'Team,' 'Division' and 'Ball_Park.' The 'DIVISION NAME' column belongs to the 'Division' object. The 'BALL_PARK_NAME' and 'OWNER' columns belong to the 'Ball_Park' object and the 'TEAM_NAME,' 'CITY,' 'SEASON_LOSSES' and 'SEASON_WINS' columns belong to the 'Team' object. The 'Team' object has relationships to the 'Ball_Park' object; however, since the 'Ball_Park' objects are present in the same table, no separate foreign key column is required as in the case of the normalized schema structure.

TABLE 7

Player_Pitcher

| NAME | PLAYS FOR | AGE | PITCHER NUMBER | CURRENT SEASON LOSSES | CURRENT SEASON WINS |
|---|---|---|---|---|---|
| John Andrews | Tigers | 22 | 22 | 7 | 25 |
| Keith McSally | Tigers | 31 | 48 | 5 | 27 |
| John Adams | Red Sox | 24 | 39 | 1 | 31 |
| Mike Wallace | Red Sox | 30 | | | |
| Terry Stone | New Sox | 30 | 54 | 10 | 22 |

Tables 8–9 and FIG. 23 are denormalized schema tables. These tables describe a different way of denormalizing the same normal schema and the structure is referenced as denormalization FORM II.

TABLE 8

Division

NAME

American East
New England
American Midwest

TABLE 9

Ball_Park

| NAME | OWNER |
|---|---|
| Boston Garden | City of Boston |
| Darlington Stadium | City of Darlington |
| NY Stadium | City of New York |

Data integrity constraints are mechanisms provided by the database system that can be used by users to declare and maintain the object model being stored in the database. A significant contribution of the integrator product to the technology is its support of the different database storage models to provide the same object model.

In the normalized form, the identity of an object in the relational table is provided and supported by a primary key constraint that is provided and supported by the relational database. The primary key constraint specifies a set of one or more columns of a table and imposes that the designated columns can contain values whose combination must be unique in the table. This ensures that for each unique object, only one row is created in the database. In order to ensure uniqueness of objects, a user must declare a primary key on a table in the columns that represent the identifying attributes(s) of the object. For example, since the name of the 'Ball_Park' object is its identifying characteristic, the normalized schema contains a primary key over the 'Name' column of the 'Ball_Park' table.

In the denormalized form, however, it may not be possible to define a primary key as the identifying attribute of an object, as more than one row could contain the same object. Refer to the 'Team Division Ball Park' table structure (Table 6). More than one row of the table contains the same 'Ball_Park' object, which gets repeated due to its relationship with the 'Team' Objects. Hence, no primary key can be defined on the "Ball_Park_Name' column. Even though more than one row contains values of 'Boston Garden') there exists in the system only one unique 'Boston Garden' Ball_Park object. This constraint, however, can no longer be enforced by the relational database itself, as no primary key can be defined for the identifying column.

In a normalized schema, relationship between two objects is specified by a foreign key. A foreign key specifies one or more columns of a source table and a target table. The relational database ensures that the source table column contains a value that matches exactly with any one primary key value in the target table. Thus a relationship between the objects from the two tables is established. For example, the normalized schema table 'Team' contains a foreign key to the 'Division' table on the 'In_Division' column. This establishes a relationship that the 'Team' object has a reference to a 'Division' object.

The object model stipulates that the 'Team' and 'Division' objects have a one to many relationship, i.e., one division has many teams associated with it. This relationship has no direct representation in the relational structure. A single foreign key constraint serves to establish the relationship for both the objects. The 'Team' object has a direct reference to a 'Division' object and all the 'Team' objects associated with a 'Division' object can be established in the relational system by a simple query by searching in the Team table for the values of the 'In_Division' column.

In a denormalized schema, the relationship between the two objects is established by existence of the two objects in the same row of the table. Referring to the 'Team_Division_Ball_Park' Table 6: the relationship between 'Red Sox' and 'Boston Garden' Objects is established by entering them in the same row, whereas since 'NY Stadium' has no team associated with its row, it contains no values in columns other than the ones associated with the 'Ball_Park' object itself.

The illustrated example uses only a one to many relationship for illustrations, however many to many relationship can also be easily supported using relational constructs and can be similarly denormalized. The many to many relationship denormalization is also supported by integrator.

Figure 10:
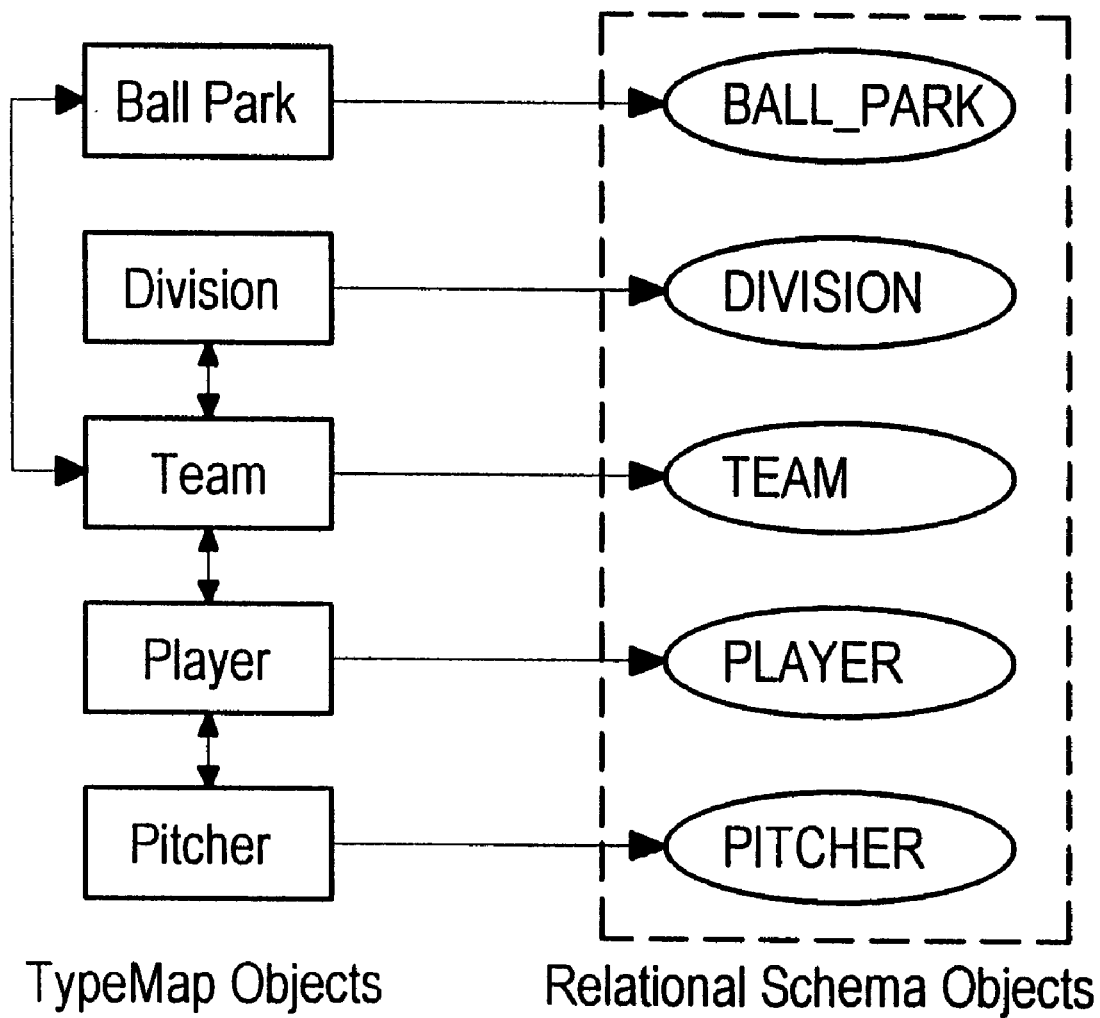
FIG. 10 illustrates integrator mapping schema.

FIG. 10 illustrates integrator mapping schema. The TypeMap object is the major object in the integrator Mapping Schema. A single TypeMap object refers to the integrator Relational Schema object created for the table. Other significant objects in the mapping schema (not shown) are AttributeMap which hold the mapping information between an object property and a relational column. Related TypeMap objects also refer to each other.

As described earlier, the integrator Mapping Process provides tools to create, change and maintain the TypeMap objects. The Mapping Process can not, however, change the Relational Schema Objects.

The integrator normalization process provides mechanisms to create logical tables from a physical table. The capture process creates the relational schema for the physical table. To create a logical table from a physical table in integrator, one or more columns must be chosen from a single physical table, some of those columns must be designated as the primary key of the logical table, and a discriminator must be provided to identity rows of the physical table that can be considered part of the logical table. For example, in the denormalized schema form described above, the following command provided by integrator will create logical tables:

oratab +t +sTEAM_DIVISION_BALL_PARK +lBALL_PARK-logical +kBall_Park_Name +cOwner +d"Ball_Park_Name is not NULL." That command will create a 'BALL_PARK_logical' table that has the same column and key structure as the normal 'BALL_PARK' table, in the integrator Relational Schema that can be used by the TypeMap objects in the Mapping Schema. Similarly, oratab +t +sTEAM_DIVISION_BALL_PARK +lTEAM_logical +kTEAM_Name +cCity +CSEASON_Losses +cSeason_WIns +cBall_Park_Name +cDivision_Name +d"Team_Name is not NULL" will create a logical table 'TEAM_logical' in integrator Relational Schema that will be similar in structure to the normalized form 'TEAM' table.

Figure 11:
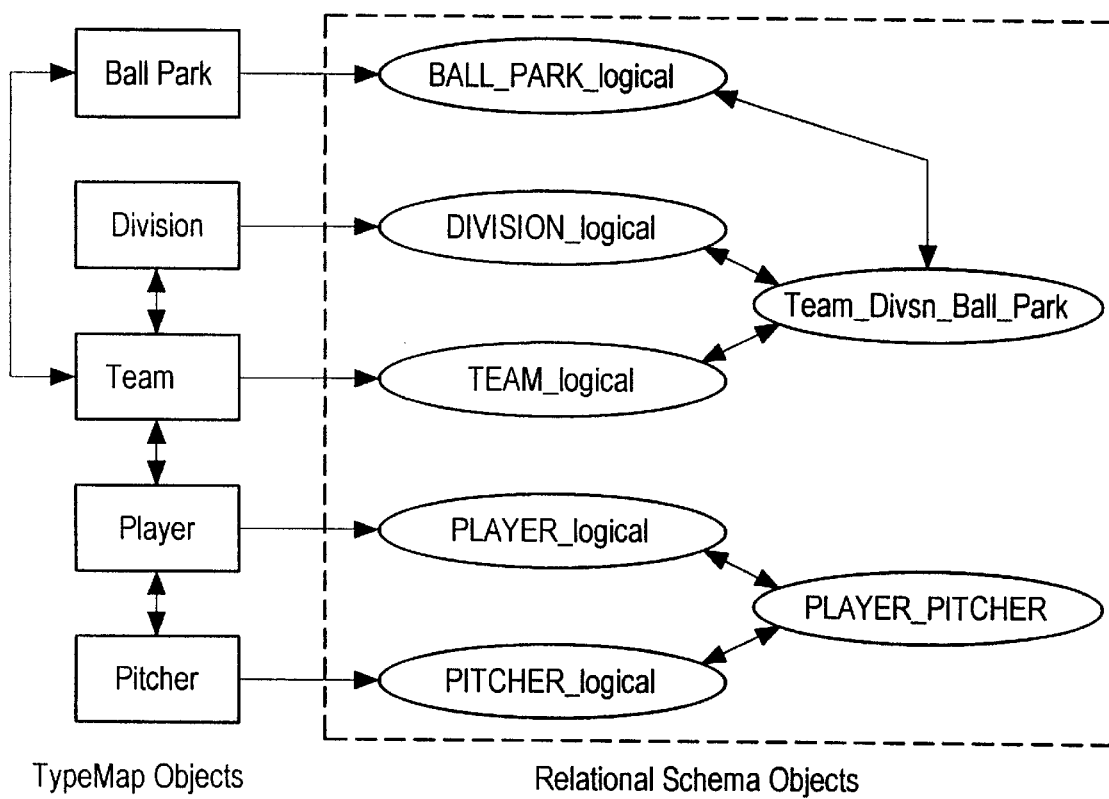
FIG. 11 illustrates integrator mapping schema with logical tables.

The following command creates a logical foreign key from the table 'TEAM_logical' to table 'BALL_PARK_logical': oratab +f +STEAM_logical+tBALL_PARK_logical+cBall_Park_Name FIG. 11 illustrates integrator mapping schema with logical tables. In the integrator Relational Schema, the logical and physical table objects maintain references to each other.

Control flows are sensitive to the use of logical tables in the integrator. A major part of the control flows described in this section handle the normalized schema structure. Denormalized schema structures are handled in a separate branch with the main control flow. This branch is denoted as a single box in each figure, which is described in greater detail in separate figures in subsequent sections.

Figure 12:
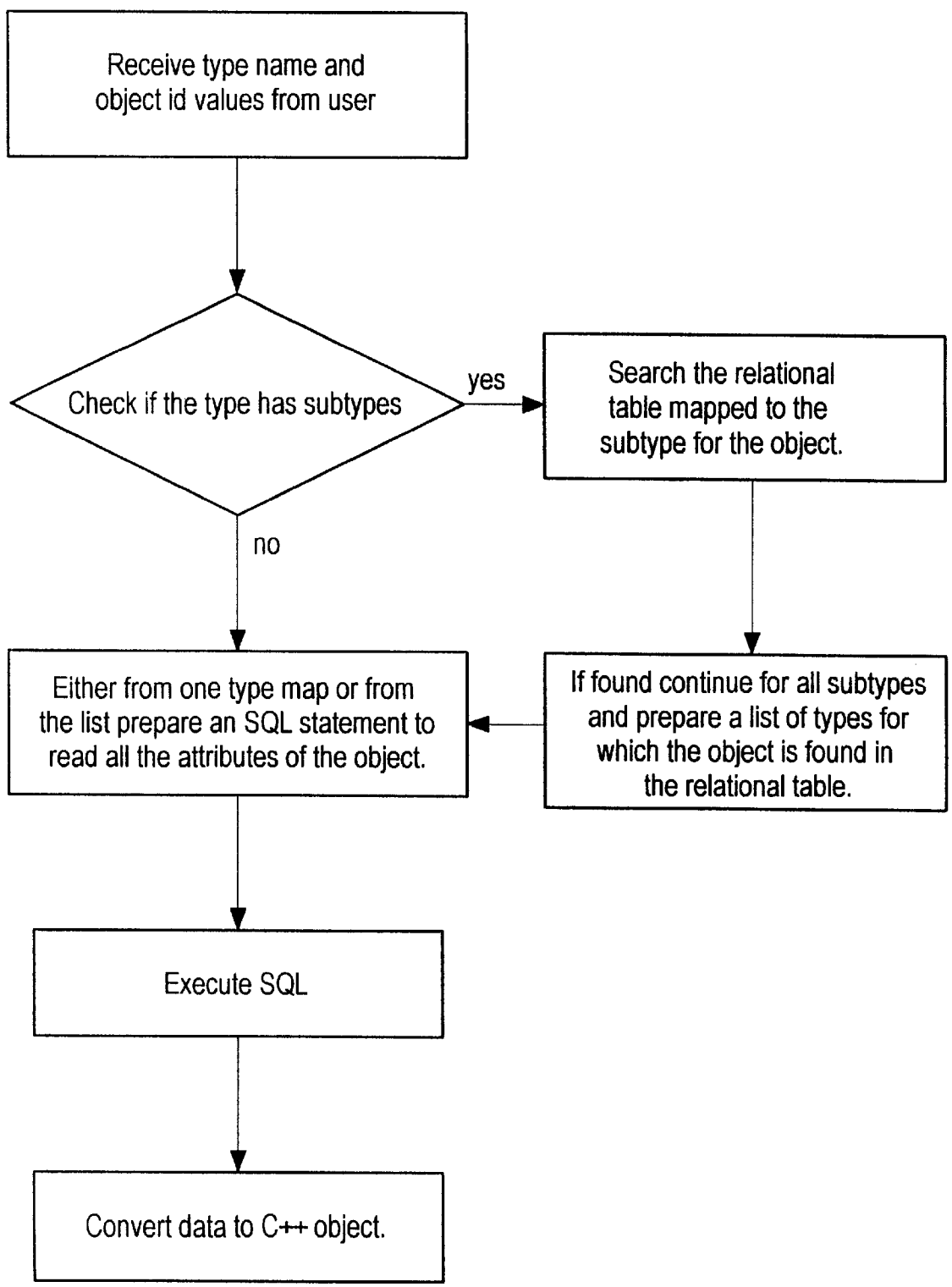
FIG. 12 illustrates control flow for activating an object from normalized schema.

Activation is the integrator process through which an object in the relational database is converted into a C++ object in a user program. FIG. 12 is a flow chart which illustrates the control flow for the process.

The following SQL statements are generated while activating the Pitcher object 'John Andrews' from the database. The first two statements establish the tables that the data needs to be read from. If the object 'John Andrews' is not found in the PITCHER table, that table will be ignored from the third statement.

Figure 13:
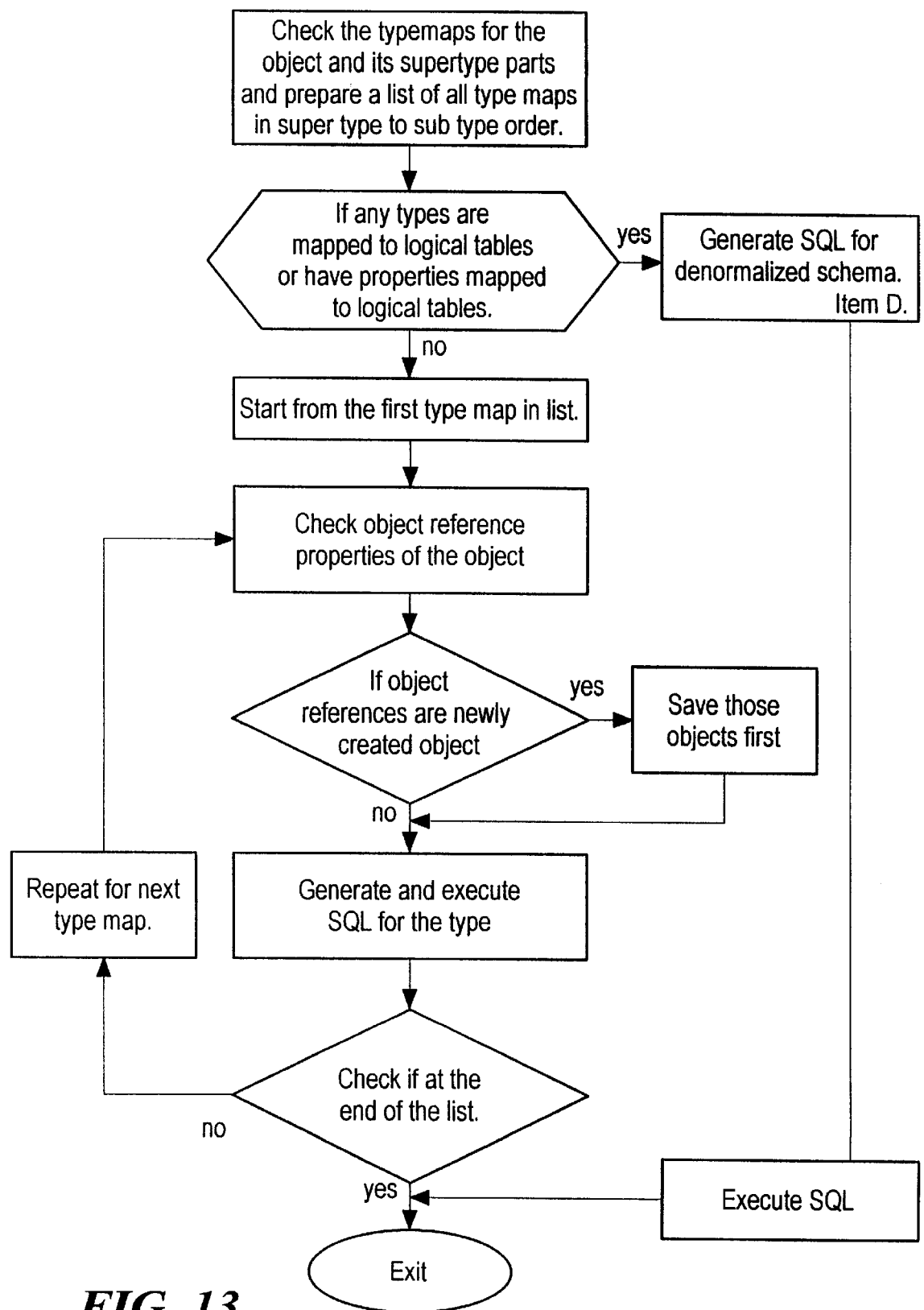
FIG. 13 illustrates control flow for creating an object in normalized schema.
Figure 14:
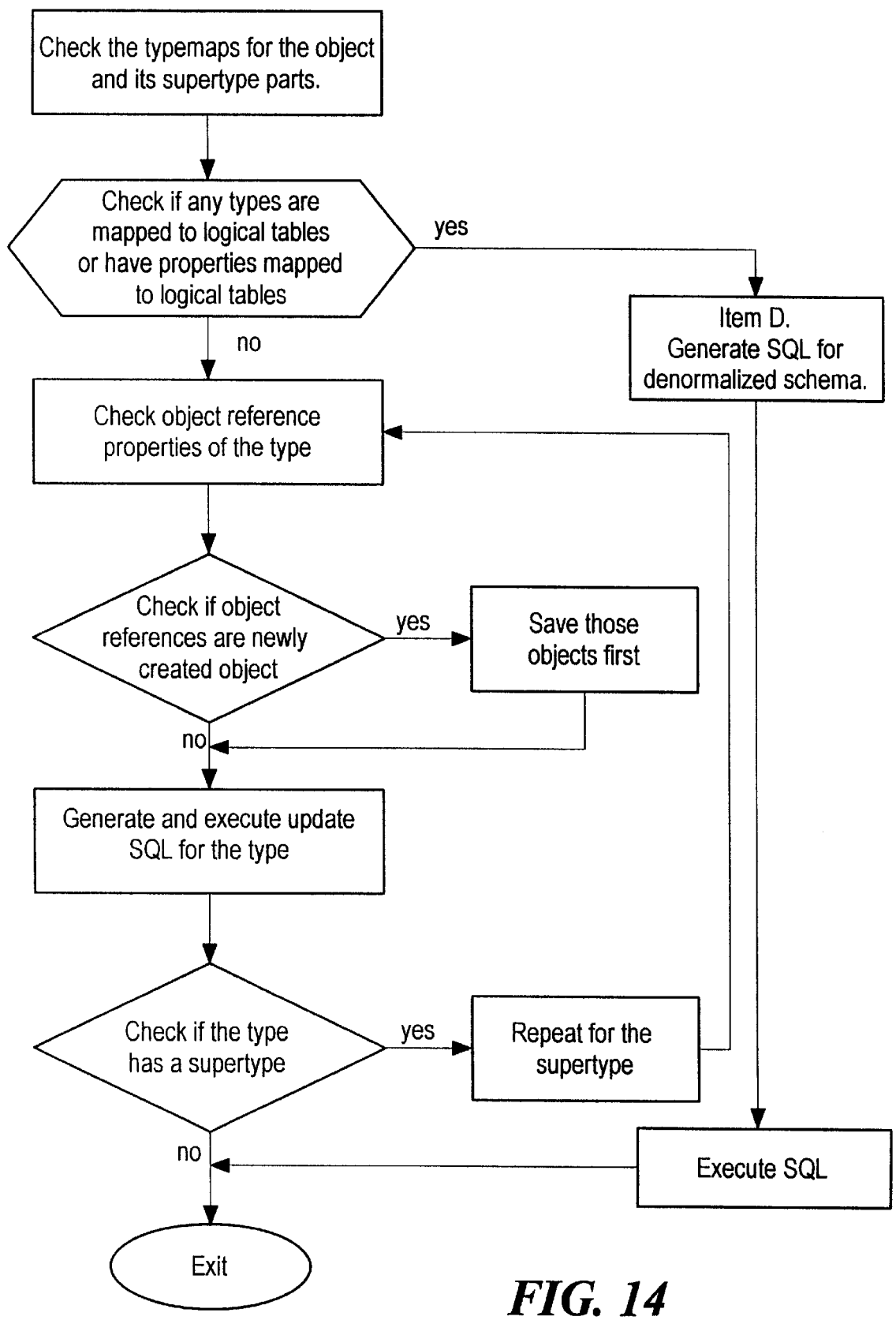
FIG. 14 illustrates control flow for updating an object in normalized schema.

SELECT count(*) FROM PLAYER WHERE NAME= 'John Andrews';

SELECT count(*) FROM PITCHER WHERE NAME= 'John Andrews';

SELECT a.Name,a.Plays_For,a.Age, b.Pitcher_Number,
  b.Current_Season_Losses, b.Current_Season_Wins
    FROM PLAYER a, PITCHER b WHERE
  a.Name+b.Name AND b.Name ='John Andrews';

Referring to FIGS. 13 and 14, a create object operation in integrator corresponds to inserting rows into one or more tables in the relational database. FIG. 13 is a flow chart which illustrates the control flow when a new object is being created in the database. For example, when a team object with properties (name: 'White Sox', city: 'Chicago', season losses: '2' season wins: '29') and a reference to a new Ball Park object with properties (name: 'Chicago Central', owner: 'City of Chicago', and has a reference to an existing Division object with properties (name: 'American MidWest') is being created new in the database, the following SQL is generated and executed in the given sequence. FIG. 14 illustrates control flow for updating an object in normalized schema.

Figure 15:
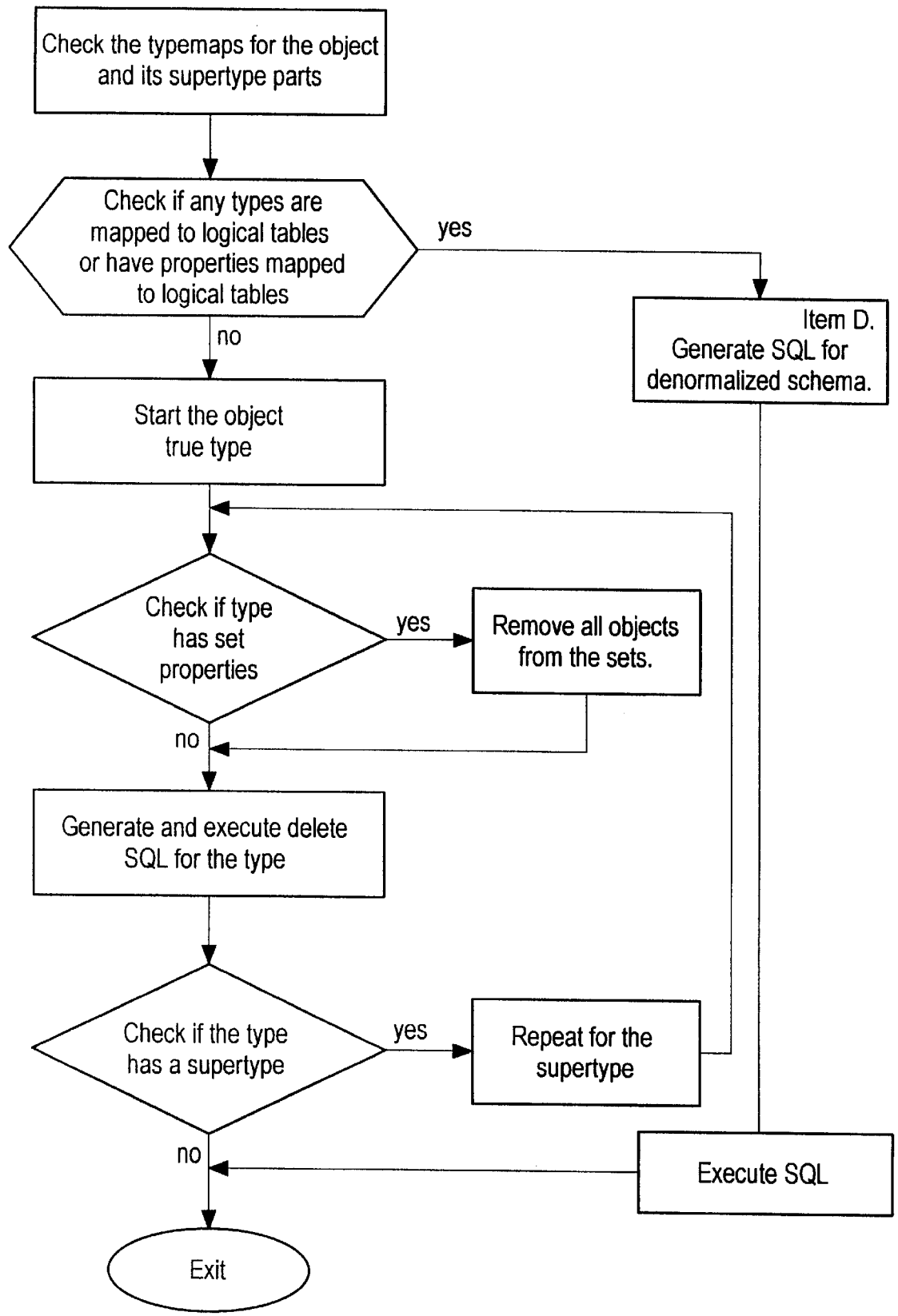
FIG. 15 illustrates control flow for deleting an object from normalized schema.

UPDATE PITCHER SET PITCHER_NUMBER = 39,CURRENT_SEASON_LOSSES =1, CURRENT_SEASON_WINS =32
WHERE
   NAME='John Adams'
UPDATE PLAYER SET PLAYS_FOR='Red Sox', AGE=25 WHERE
   NAME='John Adams';

FIG. 15 illustrates control flow for deleting an object from normalized schema. The delete operation removes an already persistent object from the database. In relational terms, the operation corresponds to deleting rows from one or more tables. When the 'John Adams' Pitcher object is being deleted from the database, the following SQL will be generated in given sequence.

DELETE FROM PITCHER WHERE NAME='John Adams'
DELETE FROM PLAYER WHERE NAME='John Adams'

Figure 16:
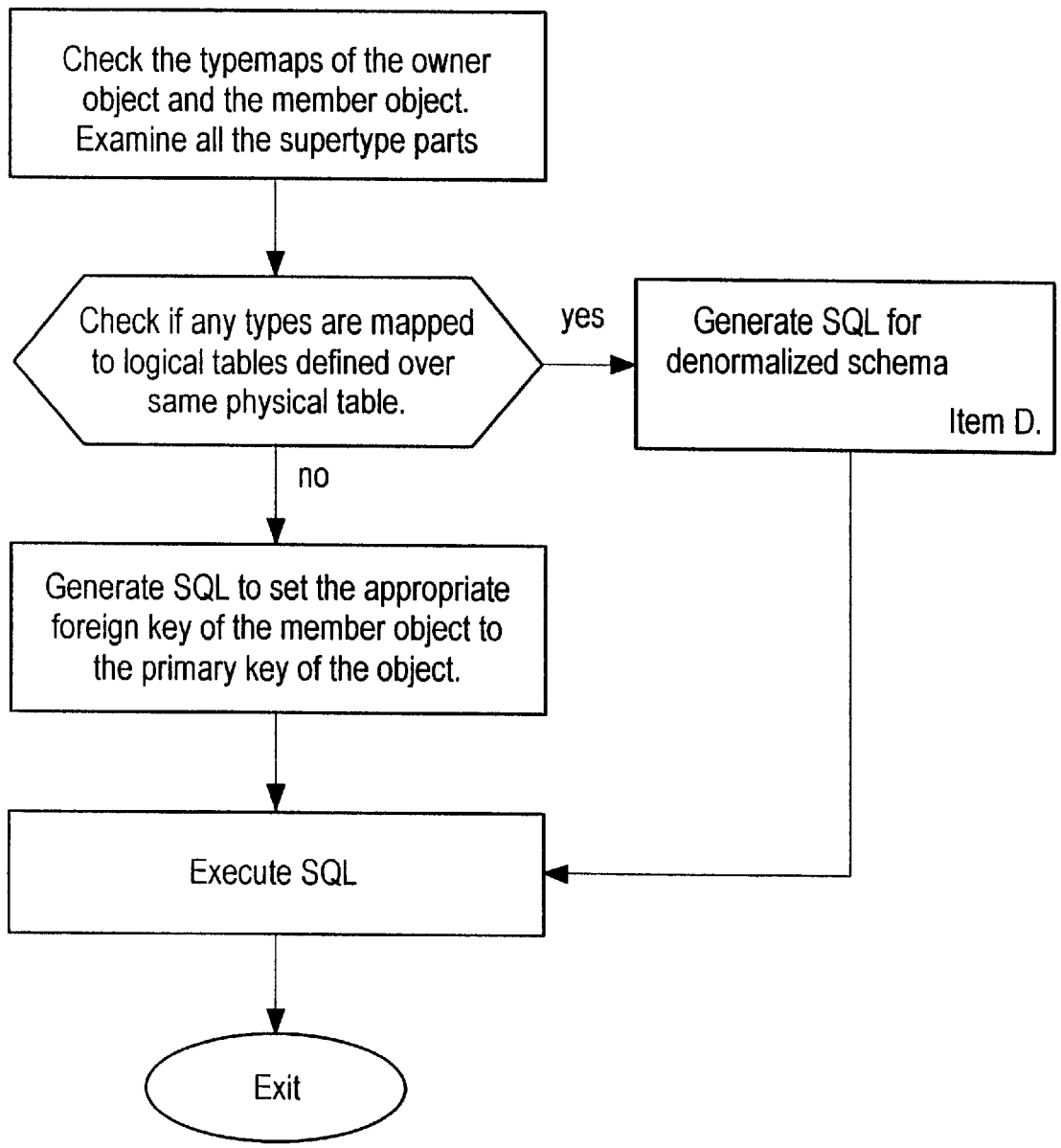
FIG. 16 illustrates control flow for inserting an object in a normalized schema collection.

FIG. 16 illustrates control flow for inserting object in a normalized schema collection. The insert operation refers to manipulations of the one to many or many to many relationships. While only the one to many case is illustrated in the examples, the many to many case is supported by the integrator system.

As described above, the many side of a one to many relationship does not have a direct representation in the relational database. Manipulation of the set in the object model, i.e., insert or remove from the set, is effected in the database by setting or unsetting an appropriate foreign key in the database. For example, if a 'Team' object is inserted into the teams set of a 'Division' object, the foreign key column of the 'Team' object is changed to contain the primary key value of the Division object.

For the purposes of the illustrated flow chart, the owner object of the set, i.e., the Division object in this example, is termed as the 'host' object, and the object being inserted into the set, i.e., the 'Team' object in the illustrated example, is termed as the 'member' object. The operation is effected by the 'host' object. When the 'Team' object 'New Sox' is inserted into the 'Division' object 'New England' and the types are mapped to tables in normalized schema form, the following SQL statement is generated and executed by integrator: UPDATE TEAM SET IN_DIVISION='New England' WHERE NAME ='New Sox'

Figure 17:
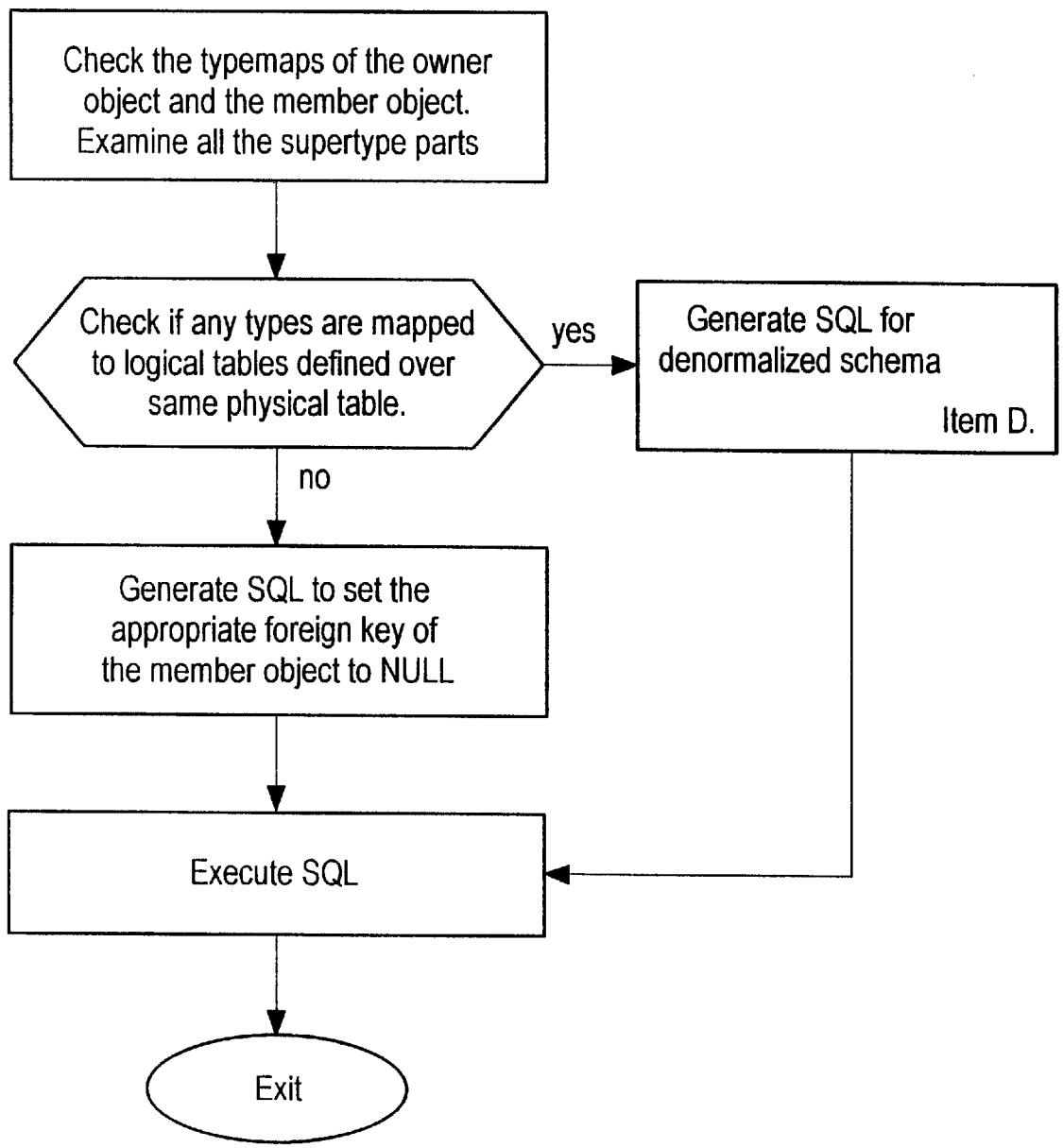
FIG. 17 illustrates control flow for removing an object from a normalized schema collection.

FIG. 17 illustrates control flow for removing an object from a normalized schema collection. Considerations for the remove operation are the same as the insert. However, for the remove operation, the corresponding foreign key in the database is set to NULL. Considering the example as above: If the 'Team' object 'New Sox' is now removed from the 'Division, object 'New England,' the following SQL statement will be generated and executed when tables are in normalized schema form.

Figure 18:
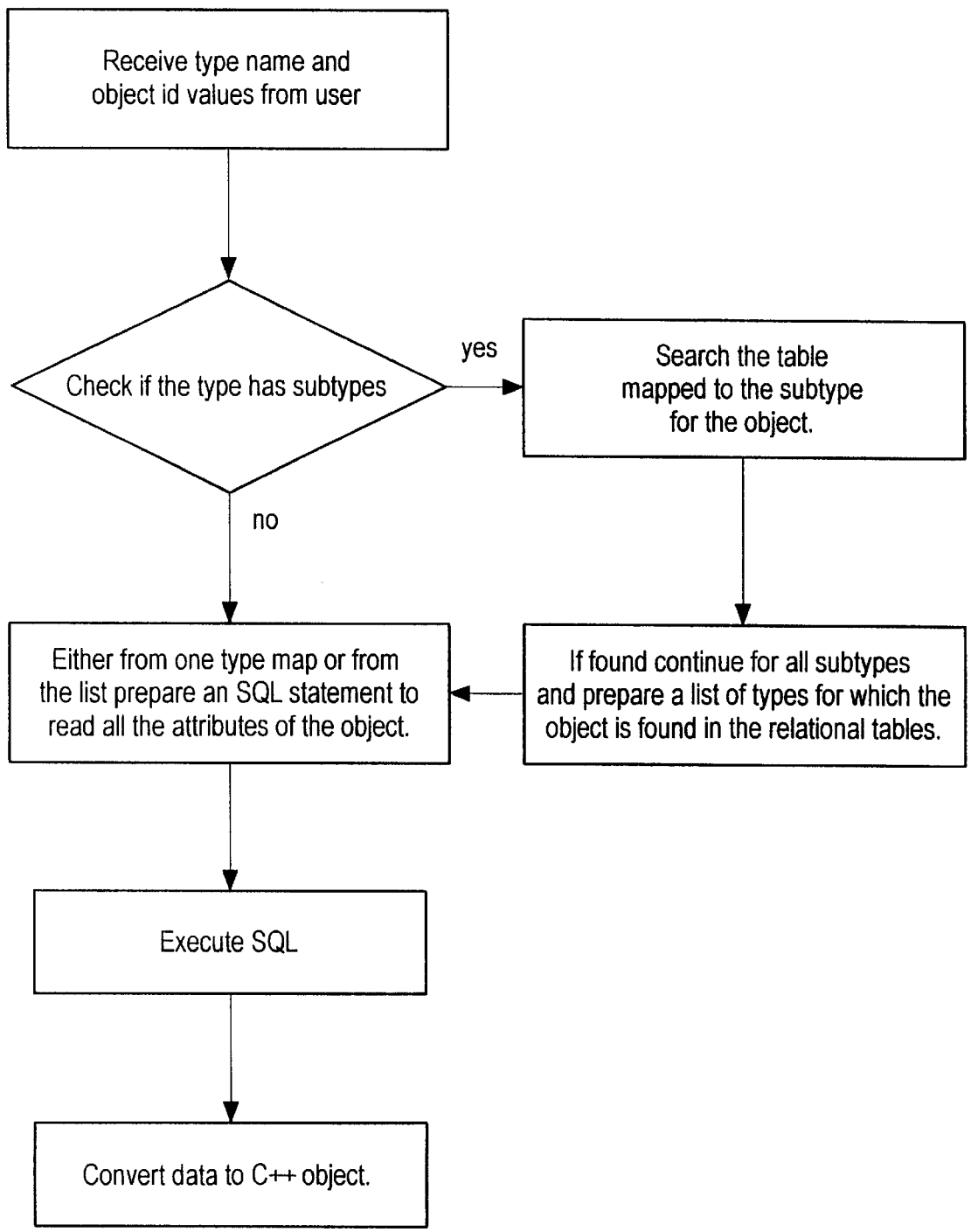
FIG. 18 illustrates control flow for activating an object from denormalized schema.

UPDATE TEAM SET IN_DIVISION=NULL WHERE NAME= 'New Sox';

FIG. 18 illustrates control flow for activating an object from denormalized schema. As described earlier, the denormalization process may result in many different relational table structures. The integrator runtime system control flow is not sensitive to specifics of the table structure, but only to the concept of denormalization. Hence only one control flow chart is required for the denormalized processing to describe control flows for any form of denormalization.

Figure 19:
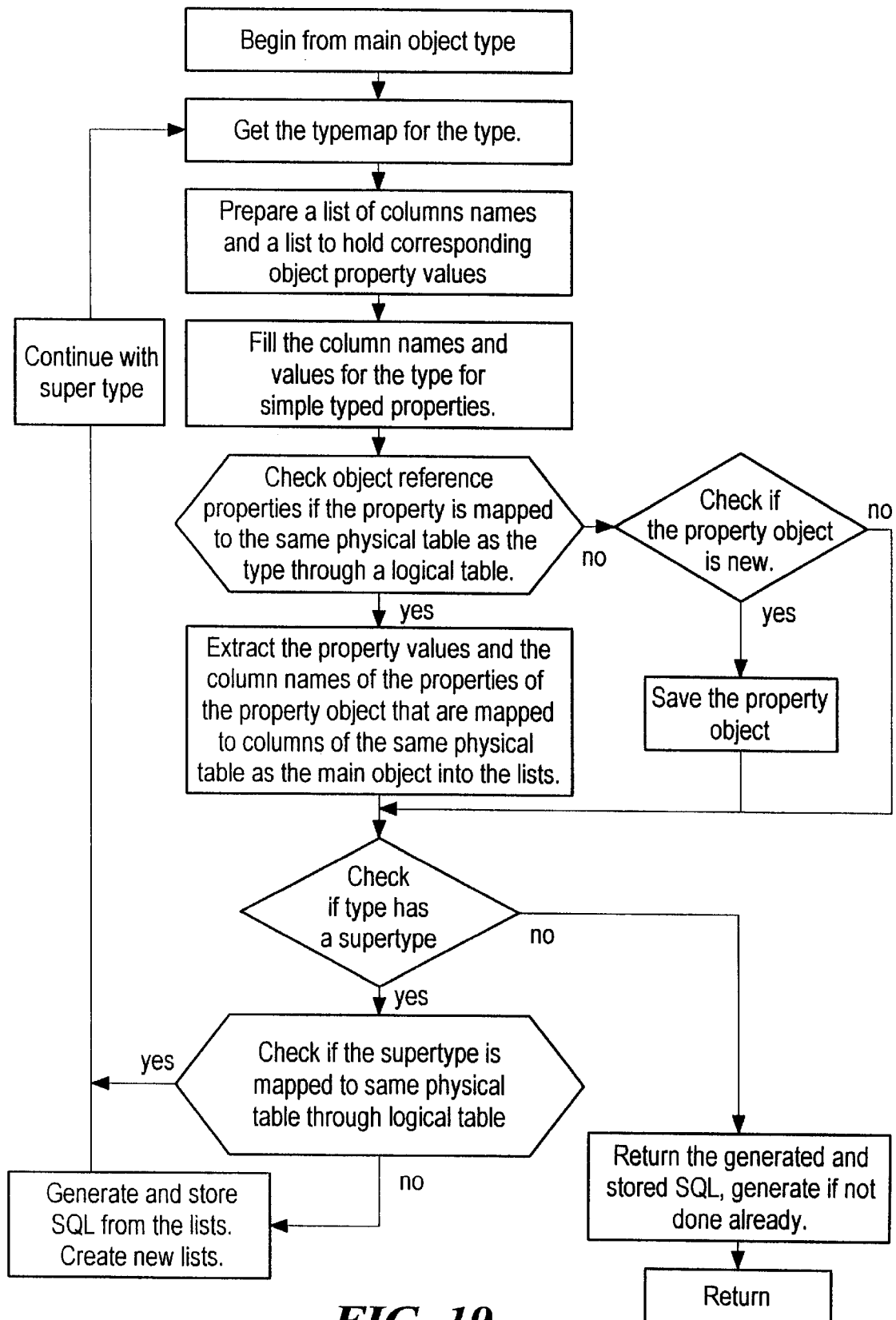
FIG. 19 illustrates control flow for generating SQL for creating an object in denormalized schema.

Referring to FIG. 19, a significant point of the denormalized schema processing is that the SQL generated is designed to provide the data integrity support. As explained earlier, the relational database itself may not provide any means to ensure data integrity for a denormalized table structure. The integrator runtime system takes that responsibility. The data integrity of a denormalized table structure is ensured by integrator through generation of correct SQL statements for all object requests generated by users. Also, as denoted in the flow charts of the normalized schema processing, the two streams have some common parts.

The activation process using logical tables in denormalized schema is quite similar to the one for tables in normalized schema. The process of 'searching' and 'reading' an object from a physical table in the normalized schema involves one or more SQL select statements to search for the object's identifying attributes in the primary key columns of the physical table. The process of 'searching' and 'reading' objects from logical tables involves one or more SQL select statements that search over the columns specified by the user as primary keys of the logical table using the discriminator clause specified by the user in the logical table definition.

For example, the following SQL statement is generated to read Pitcher object 'John Andrews' from the database table 'PLAYER_PITCHER':

SELECT count(*)FROM PLAYER_PITCHER WHERE NAME='John Andrews' and NAME is not NULL;
SELECT count(*)FROM PLAYER_PITCHER WHERE NAME='John Andrews' AND NAME is not NULL AND PITCHER_NUMBER is not NULL;
SELECT DISTINCT (a.Name), aPlays_For, a.Age, a.Pitcher_Number, a.Current_Season_Losses, a.Current_Season_Wins FROM PLAYER_PITCHER a WHERE
   a.Name='John Andrews' AND a.Name is not NULL AND a.PITCHER_NUMBER is not NULL;

As explained earlier, more than one row in a denormalized table could contain data for the same object in the columns in the database that comprise the logical table. To illustrate the flow chart, two examples are given which refer to the two denormalized schema described earlier.

Consider the example above with some extensions: a Team object with properties (name: 'White Sox', city: 'Chicago' season losses: '2' season wins: '29') and a reference to a new Ball Park object with properties (name: 'American MidWest') is being created in the database. For the purpose of this example, also consider that a new Pitcher object with properties (name: 'John Clayton', Age:25, Pitcher_Number: 31, Current_Season_Losses: 2, Current_Season_Wins: 30) is added to the Team object.

If the Team, Division and Ball_Park are mapped through logical tables to the same physical table 'Team_Division Ball Park', i.e. if the denormalized FORM I described earlier is used, the following SQL is generated and executed in given sequence:

INSERT INTO TEAM_DIVISION_BALL (BALL_PARK_NAME, OWNER,
   TEAM_NAME, CITY, SEASON_LOSSES, SEASON_WINS,
   DIVISION_NAME)

VALUES ('Chicago Central', 'City of Chicago', 'White Sox', 'Chicago', 2, 29, 'American MidWest');
INSERT INTO PLAYER_PITCHER (NAME PLAYS_FOR, AGE,
  PITCHER_NUMBER, CURRENT SEASON_LOSSES, CURRENT
  SEASON_WINS
  VALUES ('John Clayton', 'White Sox', 25, 31,2,30);
If the types, however, are mapped using the denormalized FORM II described earlier, the following SQL is generated:
  INSERT INTO BALL_PARK (NAME, OWNER)
  VALUES ('City of Chicago', 'Chicago Central');
  INSERT INTO TEAM_PLAYER_PITCHER (TEAM_NAME, CITY,
  SEASON_LOSSES,
  SEASON_WINS, IN_DIVISION,
  PLAYER_NAME,AGE,PITCHER_NUMBER,
  CURRENT_SEASON_LOSSES, CURRENT_SEASON_WINS)
  VALUES ('White Sox', 'Chicago' ,2,29, 'American Midwest', 'John Clayton',25,31,2,30);

Referring to FIG. 19 and Item D in FIG. 13, in the control flow descriptions the object being saved directly by the user, i.e., the object that the create message is started on, is referred to as the 'main object' and all object references properties of the 'main object' are referred to as 'property object'. Correspondingly, the types of the objects are termed as 'main type' and 'property type'.

Control flow for generating the denormalized schema SQL for updating an object, Box D in FIG. 14, is substantially similar to the control flow for creating an object as shown in FIG. 19. The difference in the SQL statement generated is that the 'INSERT'. . . 'SQL statement is generated for creating the object whereas 'UPDATE. . . ' SQL statement is generated for updating the object.

For instance, if the properties of the objects created in the example above are changed as follows: SEASON_LOSSES of Team object 'White Sox' is changed to 3 and 'Current_Season_Losses' property of the 'John Clayton' 'Pitcher' object is changed to 3, the SQL statement below will be generated, or if the Team Division and Ball_Park objects are mapped through logical tables to the same physical table 'Team_Division_Ball_Park', i.e., if the denormalized FORM I described earlier is used, the following respective SQL is generated and executed.
  UPDATE TEAM DIVISION_BALL_PARK SET OWNER='City of Chicago',
    CITY='Chicago', SEASON_LOSSES=3, SEASON_WINS=29, DIVISION NAME='American MidWest'
    WHERE TEAM_NAME='White Sox' and a TEAM_NAME is not NULL;
  UPDATE PLAYER_PITCHER SET PLAYS_FOR='White Sox', AGE=25,
    PITCHER_NUMBER=31,
    CURRENT_SEASON_LOSSES=3, CURRENT SEASON WINS=30
    WHERE NAME='John Clayton' and NAME is not NULL;
Since both the objects are independent and already persistent, the order of execution is not important in the case of update. However, if the types are mapped using the denormalized FORM II described above, then the following SQL is generated:
  UPDATE TEAM_PLAYER_PITCHER CITY='Chicago', SEASON_LOSSES=3

Figure 20:
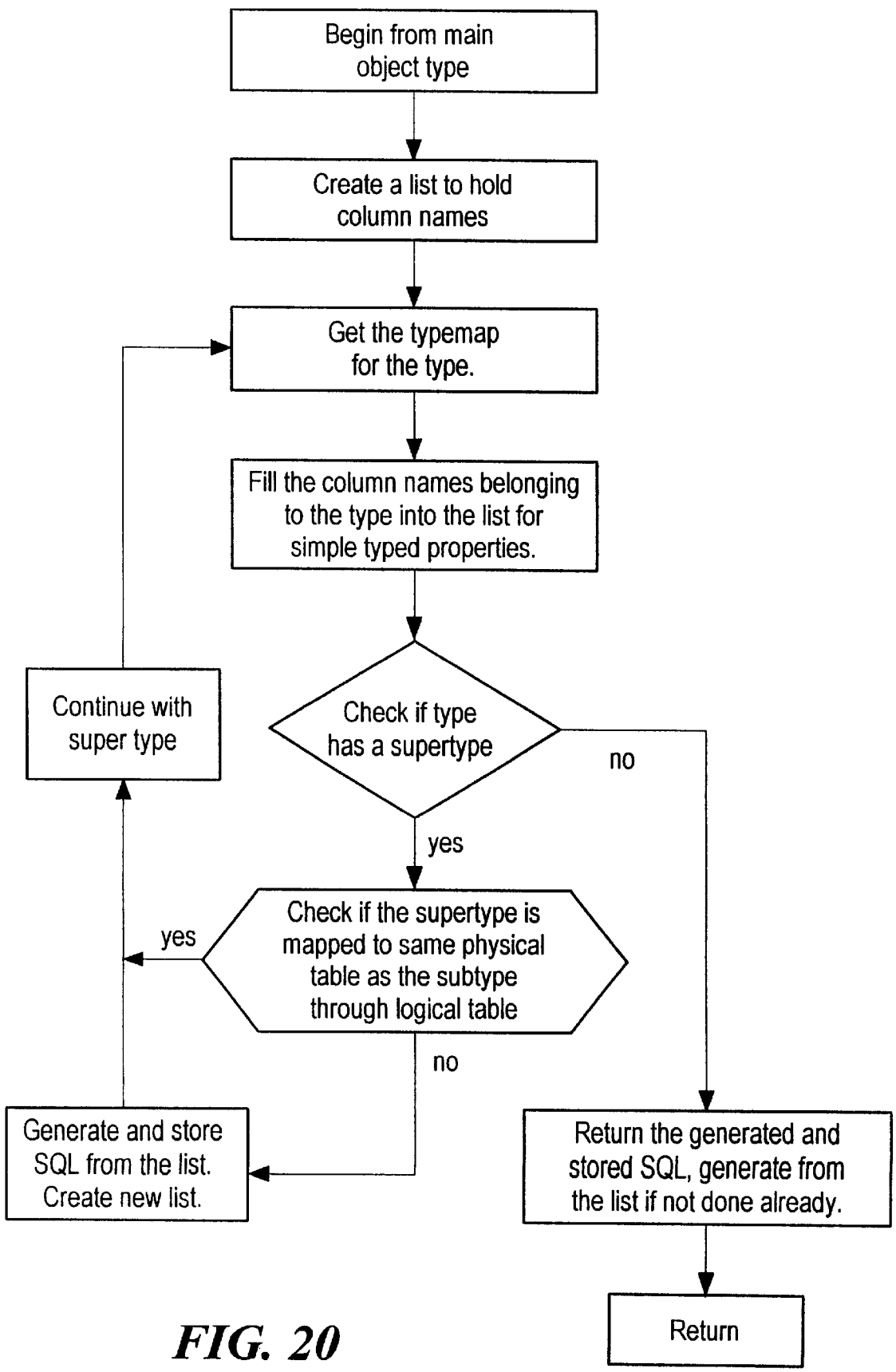
FIG. 20 illustrates control flow for generating SQL for deleting an object in denormalized schema.
Figure 21:
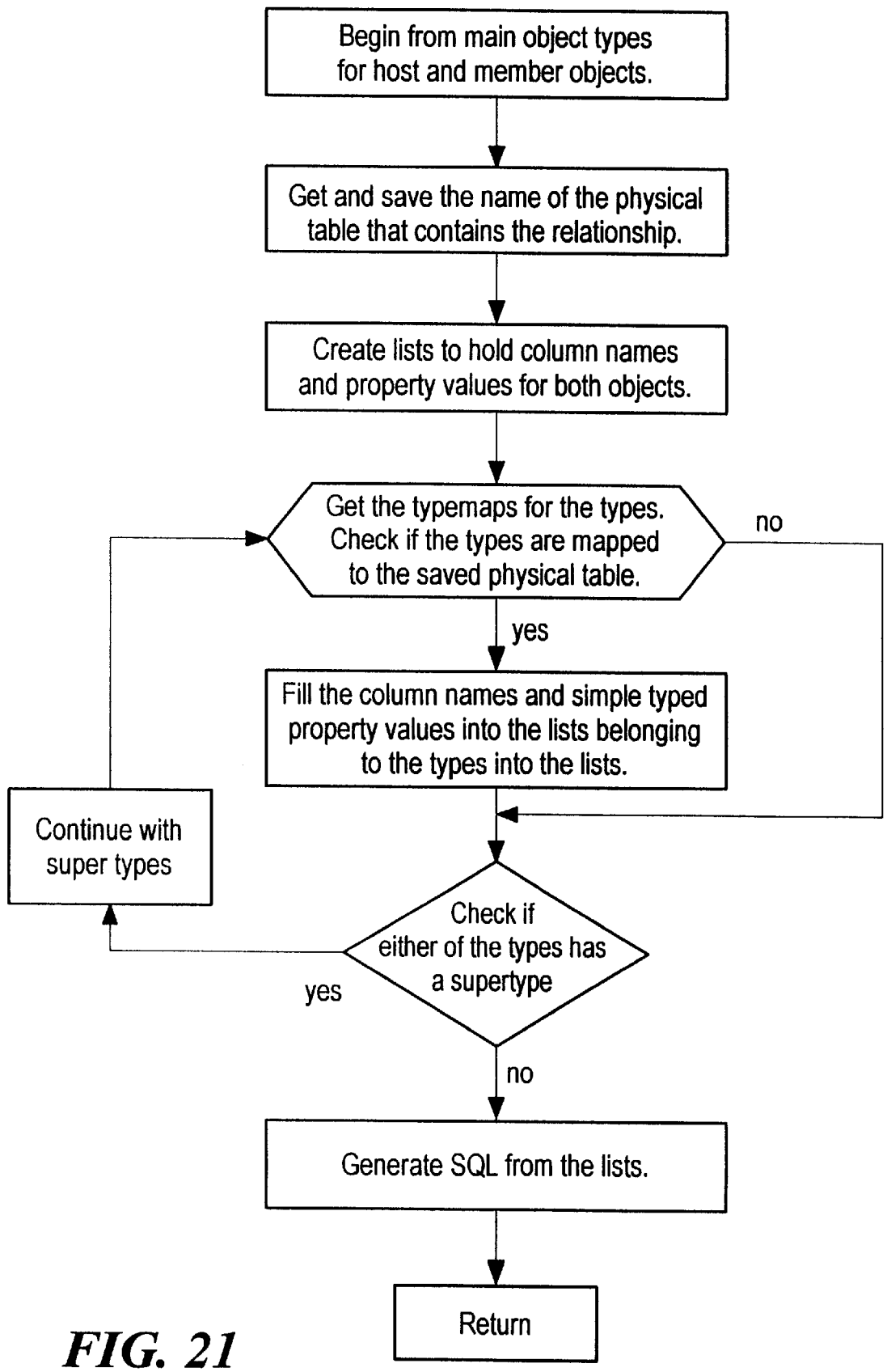
FIG. 21 illustrates control flow for generating SQL for inserting an object in denormalized schema.

SEASON_WINS=29, IN_DIVISION='AmericanMidWest'
  WHERE TEAM NAME='White Sox' and PLAYER_NAME is not NULL;
  UPDATE TEAM_PLAYER_PITCHER, CITY='Chicago',
    SEASON_LOSSES=3, SEASON_WINS=29, IN_DIVISION='American MidWest', AGE=25, PITCHER NUMBER=31,
    CURRENT_SEASON_LOSSES=3, CURRENT_SEASON_WINS=30
    WHERE PLAYER NAME='White Sox' and
    PLAYER_NAME is not NULL and PITCHER_NUMBER is not NULL;

Referring to FIG. 20, the delete object operation in integrator corresponds to setting appropriate columns in one or more tables in the relational database to NULL when the object type is mapped to tables in a denormalized schema form. Only some of the columns in a denormalized table may belong to the object being deleted. Also, the object may be repeated in more than one row. In order to effectively 'delete' the object, all the columns belonging to the object must be set to NULL in all the rows the object is repeated in. The following figure describes the control flow employed to create appropriate SQL to delete an object. This control flow diagram essentially contains the details of the Box D, FIG. 15. To illustrate with an example, when 'Team' object 'New Sox' is deleted, the following SQL statement is generated and executed by integrator:
Denormalized Schema Form I:
  UPDATE TEAM_DIVISION_BALL_PARK SET TEAM_NAME=NULL,
    CITY=NULL, SEASON_LOSSES=NULL,SEASON_WINS=NULL
    WHERE TEAM_TEAM='New Sox' and TEAM_NAME is not NULL;
Denormalized Schema Form II:
  UPDATE TEAM_PITCHER_PLAYER SET
    TEAM_NAME=NULL,CITY=NULL, SEASON_LOSSES=NULL,
    SEASON_LOSSES=NULL, HOME_FIELD=NULL, IN_DIVISION=NULL
    WHERE TEAM_NAME='New Sox' and TEAM_NAME is not NULL;

Referring to FIG. 21, the relationship between two objects is signified in a denormalized schema structure by the existence of the two objects in the same row of the table. Hence, the insert operation in integrator corresponds to creating a new row in the table and filling appropriate columns of the tables with the property values from the two objects.

To illustrate with an example, when a new 'Pitcher' object with properties name: 'John Clayton', Age: 25, Pitcher_Number: 31, Current_Season_Losses: 2, Current_Season_Wins: 30 is added to an existing 'Team' object 'Red Sox,' the following SQL statement is generated.
  INSERT INTO PLAYER_PITCHER (
    NAME,PLAYS_FOR,AGE,PITCHER_NUMBER,
  CURRENT_SEASON_LOSSES,
    CURRENT_SEASON_WINS)
    VALUES ('John Clayton', 'Red Sox', 25,31,2,30);
      Denormalized Schema Form II:
    INSERT INTO TEAM_PLAYER_PITCHER
    (TEAM_NAME,CITY,SEASON_LOSSES, SEASON_WINS, IN_DIVISION,
    PLAYER_NAME,AGE,PITCHER_NUMBER, CURRENT_SEASON_LOSSES,CURRENT_
SEASON_WINS)
VALUES ('Red Sox', 'Boston',1,31, 'New England',
'John Clayton',25,31,2,30);

The SQL statement generated looks the same as the one generated for 'Create' object; however, the difference is that for an 'Insert' operation only one table needs to be updated, whereas for 'Create' all the tables in the type hierarchy are updated.

FIG. 21 illustrates the control flow employed to generate appropriate SQL statements. The object with the set property, the 'Team' object in this case, is termed as the 'host' object and the object being inserted into the set, 'Pitcher,' is termed as the 'member' object.

Figure 22:
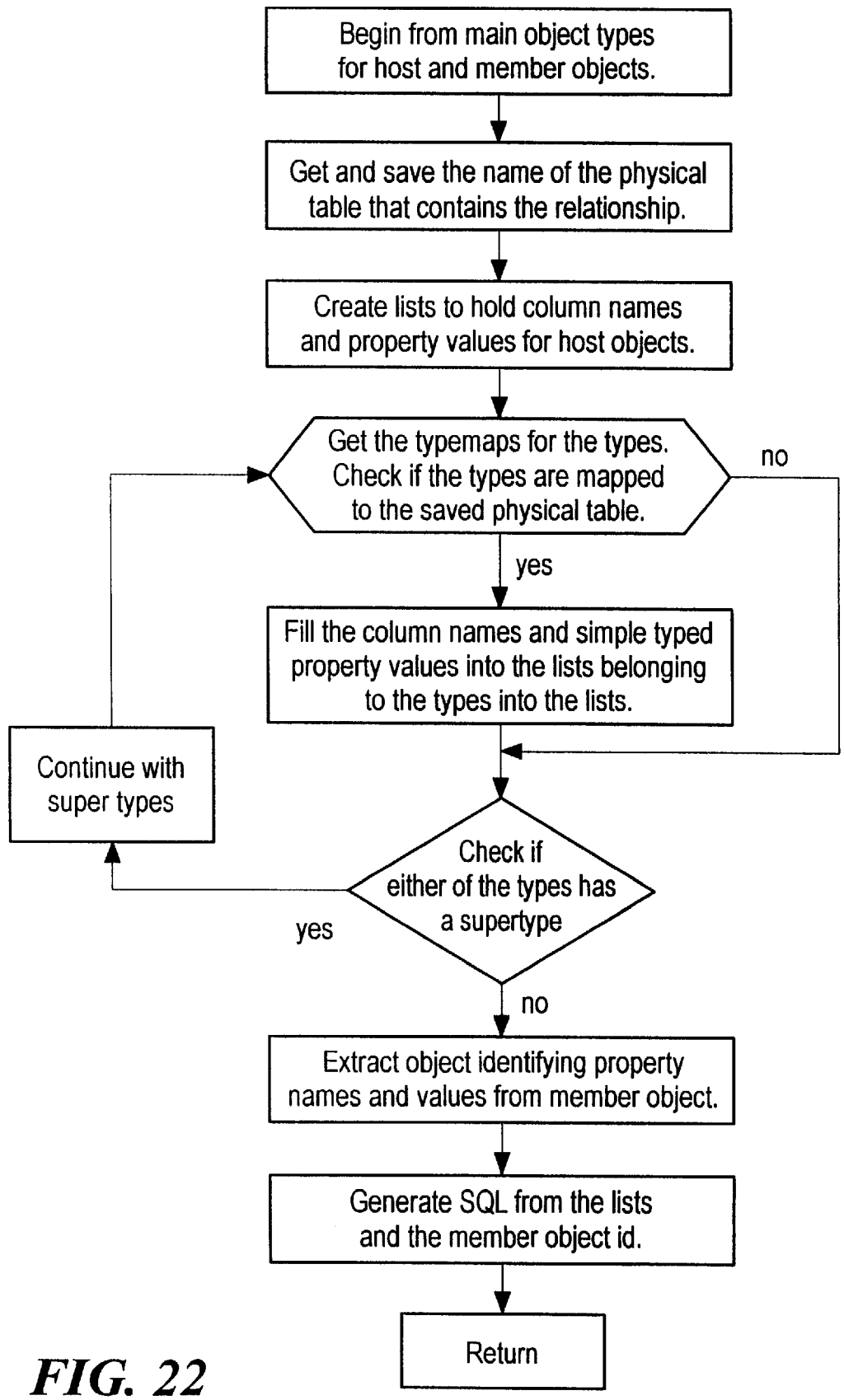
FIG. 22 illustrates control flow for generating SQL for removing an object in denormalized schema.

Referring to FIG. 22, the relationship between two objects is signified in a denormalized schema structure by the existence of the two objects in the same row of the table. Hence, the remove operation in integrator corresponds to moving the two objects into separate rows of the table. This can be effected in a number of ways.

Considering the object with set property as the 'host' object and the object being inserted as the 'member' object: integrator effects the remove operation by creating a new row in the table with only the columns belonging to the 'host' object and then setting the same columns to NULL in the row that contains both objects.

To illustrate with an example, when 'Team' object 'Red Sox' is removed from 'Division' object 'New England,' the following SQL statement are generated and executed in given sequence for denormalized schema form I.

INSERT INTO TEAM_DIVISION_BALL_PARK
(DIVISION_NAME)
VALUES ('New England');
UPDATE TEAM_DIVISION_BALL_PARK SET
DIVISION_NAME=NULL,
SEASON_LOSSES=NULL, IN_DIVISION=NULL
WHERE PLAYER_NAME='John Adams;
and PLAYER_NAME is not NULL and PITCHER_
NUMBER is not NULL FIG. 22 illustrates the control flow integrator employs to generate appropriate SQL statements for the 'Remove' operation. The control flow is quite similar to the one used in the 'Insert' operation with a few differences. The 'Insert' operation requires column and property values from both objects, whereas the 'Remove' operation requires the column names and property values form the host object and only the object property values from the member object.

It should be understood that various changes and modifications may be made from the embodiments herein disclosed. Accordingly, the invention is not to be viewed as limited except by the scope and spirit of the appended claims.

What is claimed:

1. A method for enabling an object oriented user application to access a relational database having one or more physical tables segmented into rows and columns, comprising:

defining a logical table comprising a subset of columns from at least one of the one or more physical tables;

designating one column of the logical table as a logical primary key column;

forming a normalized relational schema object representing the logical table;

generating, responsive to the normalized relational schema object, one or more object classes associated with the normalized relational schema object; and employing an object of an object class including the one or more object classes associated with the normalized relational schema object and a respective corresponding logical primary key value to access data in the at least one of the physical tables in the relational database.

2. The method of claim 1 including the further step of employing normalization to create foreign key relationships from a first of the one or more physical tables or the logical table to another physical or logical table having a physical or logical primary key.

3. The method of claim 1 including the further step of supplying a discriminator constraint for the logical table.

4. An apparatus for facilitation of data exchange between an object oriented user application and a relational database having one or more physical tables segmented into rows and columns, comprising:

an integrator operative to define a logical table comprising a subset of columns from at least one of the one or more physical tables, the integrator being further operative to designate at least one column of the logical table as a logical primary key column, and being further operative to form a normalized relational schema object representing the logical table, and being further operative, responsive to said normalized relational schema object, to generate one or more object classes associated with said normalized relational schema object; and a repository which employs the one or more object classes and the logical table and respective corresponding logical primary key values to facilitate access of data in the at least one of the one or more physical tables in the relational database by the object oriented user application.

5. The apparatus of claim 4 wherein the at least one of the one or more physical tables is a denormalized table.

6. The apparatus of claim 5 further comprising a normalization processor operative to create foreign key relationships from the at least one of the one or more physical tables or the logical table to another physical or logical table having a physical or logical primary key.

7. The apparatus of claim 4 further including a discriminator constraint associated with the logical table.

8. A method for enabling access to a relational database from an object oriented program, comprising:

capturing one or more denormalized relational schema from said relational database, said one or more relational schema corresponding to a physical table segmented into rows and columns;

forming a normalized relational schema object representing a logical table, said logical table comprising a subset of said columns of said physical table; and generating, responsive to said normalized relational schema object, one or more object class definitions associated with said normalized relational schema object.

9. The method of claim 8, further comprising:

creating, responsive to said capturing said one or more denormalized relational schema from said relational database, a respective one or more denormalized relational schema objects; and wherein said forming said normalized relational schema object is responsive to said one or more denormalized relational schema objects.

10. The method of claim 8, wherein said one or more object class definitions are represented by at least one type definition for an object oriented programming language.

11. The method of claim 10, wherein said object oriented programming language is C++.

12. The method of claim 10, wherein said at least one type definition is predefined.

13. The method of claim 8, wherein said subset of said columns of said physical table is user defined.

14. The method of claim 8, wherein an identity of said normalized relational schema object is defined by a primary key constraint in one or more of said subset of said columns of said physical table.

15. A method for enabling access to a relational database from an object oriented program, comprising:

inputting a predetermined one or more denormalized relational schema objects, said set of one or more denormalized relational schema objects corresponding to a physical table in said relational database segmented into rows and columns;

forming a normalized schema object, responsive to said one or more denormalized relational schema objects, said normalized relational schema object representing a logical table comprising a subset of said columns of said physical table; and generating, responsive to said normalized relational schema object, one or more object classes associated with said normalized relational schema object.

16. A system for enabling access to a relational database from an object oriented program, comprising:

a capture process for capturing one or more denormalized relational schema from said relational database, said one or more relational schema corresponding to a physical table segmented into rows and columns;

a normalization process for forming a normalized relational schema object representing a logical table, said logical table comprising a subset of said columns of said physical table; and a mapping process for generating, responsive to said normalized relational schema object, one or more object classes associated with said normalized relational schema object.

17. A system for enabling access to a relational database from an object oriented program, comprising:

a normalization process for inputting one or more denormalized relational schema objects, said set of one or more denormalized relational schema objects corresponding to a physical table segmented into rows and columns, said normalization process further forming a normalized schema object, responsive to said set one or more denormalized relational schema objects, said normalized relational schema object representing a logical table comprising a subset of said columns of said physical table; and a mapping process for generating, responsive to said normalized relational schema object, one or more object classes associated with said normalized relational schema object.

18. A system for enabling an object oriented user application to access a relational database having one or more physical tables segmented into rows and columns, comprising:

means for defining a logical table comprising a subset of columns from at least one of the one or more physical tables;

means for designating one column of the logical table as a logical primary key column;

means for forming a normalized relational schema object representing the logical table;

means for generating, responsive to the normalized relational schema object, one or more object classes associated with the normalized relational schema object; and means for employing an object of an object class including the one or more object classes associated with the normalized relational schema object and a respective corresponding logical primary key value to access data in the at least one of the physical tables in the relational database.

19. A system for enabling access to a relational database from an object oriented program, comprising:

means for capturing one or more denormalized relational schema from said relational database, said one or more relational schema corresponding to a physical table segmented into rows and columns;

means for forming a normalized relational schema object representing a logical table, said logical table comprising a subset of said columns of said physical table; and means for generating, responsive to said normalizing relational schema object, one or more object classes associated with said normalized relational schema object.

20. A system for enabling access to a relational database from an object oriented program, comprising:

means for inputting a predetermined set of one or more denormalized relational schema objects, said set one or more denormalized relational schema objects corresponding to a physical table segmented into rows and columns;

means for forming a normalized schema object, responsive to said set one or more denormalized relational schema objects, said normalized relational schema object representing a logical table comprising a subset of said columns of said physical table; and means for generating, responsive to said normalized relational schema object, one or more object classes associated with said normalized relational schema object.

* * * * *

(12) EX PARTE REEXAMINATION CERTIFICATE (8940th)
United States Patent
Pandit

(10) Number: US 5,937,402 C1
(45) Certificate Issued: Apr. 3, 2012

(54) SYSTEM FOR ENABLING ACCESS TO A RELATIONAL DATABASE FROM AN OBJECT ORIENTED PROGRAM

(75) Inventor: Jayant G. Pandit, Lowell, MA (US)

(73) Assignee: Datatern, Inc., New York, NY (US)

Reexamination Request:
No. 90/011,854, Aug. 9, 2011

Reexamination Certificate for:
Patent No.: 5,937,402
Issued: Aug. 10, 1999
Appl. No.: 08/879,241
Filed: Jun. 19, 1997

(51) Int. Cl.
*G06F 17/30* (2006.01)

(52) U.S. Cl. .............. 707/4; 707/999.002; 707/999.003; 707/999.1; 707/999.103

(58) Field of Classification Search .................. None
See application file for complete search history.

(56) References Cited

To view the complete listing of prior art documents cited during the proceeding for Reexamination Control Number 90/011,854, please refer to the USPTO's public Patent Application Information Retrieval (PAIR) system under the Display References tab.

*Primary Examiner* — Kavita Padmanabhan

(57) ABSTRACT

Logical tables and logical keys are employed to facilitate interaction between user applications and a relational database. Each logical table is a group of at least one column from a table or view associated with a relational database, and can be utilized like a relational table or view. Each logical primary or foreign key is a key between logical and physical tables that behaves like an actual primary or foreign key. A normalization process allows creation of integrator relational schema objects from existing captured tables. Once a denormalized table is captured from a database the normalization process allows the user to define different logical tables using subsets of the columns of the table. One or more columns of the logical table are designated as primary key. The logical tables interact with the mapping process in the same manner as physical tables.

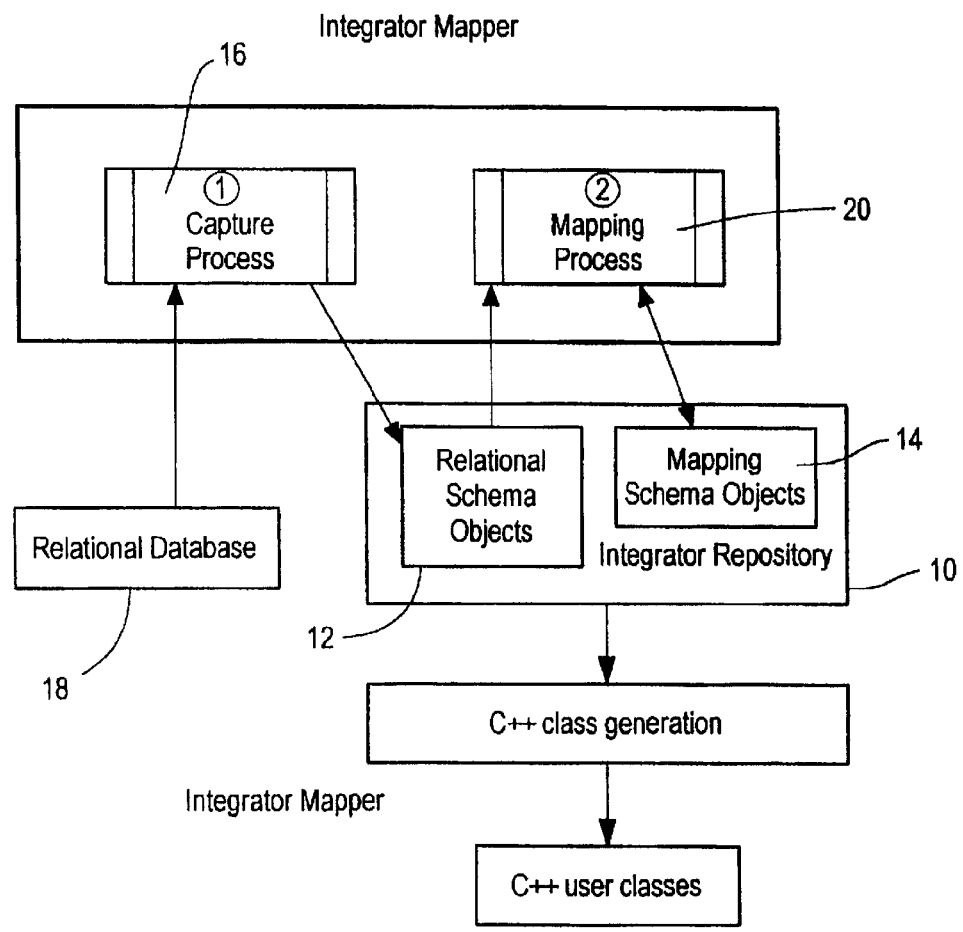

US 5,937,402 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 and 18 is confirmed.

Claims 8, 15, 16, 17, 19 and 20 are determined to be patentable as amended.

Claims 9-14, dependent on an amended claim, are determined to be patentable.

New claims 21-23 are added and determined to be patentable.

8. A method for enabling access to a relational database from an object oriented program, comprising:

capturing one or more denormalized relational schema from said relational database, said one or more *denormalized* relational schema corresponding to a physical table segmented into rows and columns;

forming a normalized relational schema object representing a logical table, said logical table comprising a subset of said columns of said physical table; and generating, responsive to said normalized relational schema object, one or more object class definitions associated with said normalized relational schema object.

15. A method for enabling access to a relational database from an object oriented program, comprising:

inputting a predetermined one or more denormalized relational schema objects, said set of one or more denormalized relational schema objects corresponding to a physical table in said relational database segmented into rows and columns;

forming a normalized *relational* schema object, responsive to said one or more denormalized relational schema objects, said normalized relational schema object representing a logical table comprising a subset of said columns of said physical table; and generating, responsive to said normalized relational schema object, one or more object classes associated with said normalized relational schema object.

16. A system for enabling access to a relational database from an object oriented program, comprising:

a capture process for capturing one or more denormalized relational schema from said relational database, said one or more *denormalized* relational schema corresponding to a physical table segmented into rows and columns;

a normalization process for forming a normalized relational schema object representing a logical table, said logical table comprising a subset of said columns of said physical table; and a mapping process for generating, responsive to said normalized relational schema object, one or more object classes associated with said normalized relational schema object.

17. A system for enabling access to a relational database from an object oriented program, comprising:

a normalization process for inputting one or more denormalized relational schema objects, said set of one or more denormalized relational schema objects corresponding to a physical table segmented into rows and columns, said normalization process further forming a normalized *relational* schema object, responsive to said set *of* one or more denormalized relational schema objects, said normalized relational schema object representing a logical table comprising a subset of said columns of said physical table; and a mapping process for generating, responsive to said normalized relational schema object, one or more object classes associated with said normalized relational schema object.

19. A system for enabling access to a relational database from an object oriented program, comprising:

means for capturing one or more denormalized relational schema from said relational database, said one or more *denormalized* relational schema corresponding to a physical table segmented into rows and columns;

means for forming a normalized relational schema object representing a logical table, said logical table comprising a subset of said columns of said physical table; and means for generating, responsive to said [normalizing] *normalized* relational schema object, one or more object classes associated with said normalized relational schema object.

20. A system for enabling access to a relational database from an object oriented program, comprising:

means for inputting a predetermined set of one or more denormalized relational schema objects, said set *of* one or more denormalized relational schema objects corresponding to a physical table segmented into rows and columns;

means for forming a normalized *relational* schema object, responsive to said set *of* one or more denormalized relational schema objects, said normalized relational schema object representing a logical table comprising a subset of said columns of said physical table; and means for generating, responsive to said normalized relational schema object, one or more object classes associated with said normalized relational schema object.

*21. A method for enabling an object oriented user application to access a relational database having one or more physical tables segmented into rows and columns, the method comprising:*

*defining a logical table separate from the relational database, the logical table comprising a subset of columns from at least one of the one or more physical tables in the relational database;*

*designating one column of the logical table as a logical primary key column;*

*forming a normalized relational schema object representing the logical table;*

*generating, responsive to the normalized relational schema object, one or more object classes associated with the normalized relational schema object; and*

*employing an object of an object class including the one or more object classes associated with the normalized relational schema object and a respective corresponding logical primary key value to access data in the at least one of the physical tables in the relational database.*

*22. The method of claim 21 including the further step of employing normalization to create foreign key relationships from a first of the one or more physical tables or the logical table to another physical or logical table having a physical or logical primary key.*

*23. The method of claim 21 including the further step of supplying a discriminator constraint for the logical table.*

\* \* \* \* \*